United States Patent
Takahashi et al.

(10) Patent No.: US 11,003,062 B2
(45) Date of Patent: May 11, 2021

(54) INFORMATION PROCESSING DEVICE, METHOD OF INFORMATION PROCESSING, AND IMAGE DISPLAY SYSTEM

(71) Applicant: SONY CORPORATION, Tokyo (JP)

(72) Inventors: Shuichi Takahashi, Kanagawa (JP); Shuichi Haga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 71 days.

(21) Appl. No.: 15/560,193

(22) PCT Filed: Feb. 2, 2016

(86) PCT No.: PCT/JP2016/053087
§ 371 (c)(1),
(2) Date: Sep. 21, 2017

(87) PCT Pub. No.: WO2016/157996
PCT Pub. Date: Oct. 6, 2016

(65) Prior Publication Data
US 2018/0095347 A1    Apr. 5, 2018

(30) Foreign Application Priority Data

Mar. 31, 2015   (JP) .............................. JP2015-072542

(51) Int. Cl.
*G03B 21/14*    (2006.01)
*H04N 9/31*     (2006.01)
(Continued)

(52) U.S. Cl.
CPC ......... *G03B 21/147* (2013.01); *G03B 21/142* (2013.01); *G03B 37/00* (2013.01);
(Continued)

(58) Field of Classification Search
CPC ...... G03B 21/13; G03B 21/26; G03B 21/142; G03B 21/145; G03B 21/147;
(Continued)

(56) References Cited

U.S. PATENT DOCUMENTS 8,643,788 B2   2/2014  Kondo et al.
8,840,250 B1 *  9/2014  Yao .......................... G01S 17/46
                                                   345/633
(Continued)

FOREIGN PATENT DOCUMENTS

CN   101438579 A   5/2009
EP     1499119 A1  1/2005
(Continued)

OTHER PUBLICATIONS

International Search Report and Written Opinion of PCT Application No. PCT/JP2016/053087, dated May 10, 2016, 10 pages of ISRWO.

(Continued)

*Primary Examiner* — Christina A Riddle
*Assistant Examiner* — Christopher A Lamb, II
(74) *Attorney, Agent, or Firm* — Chip Law Group

(57) ABSTRACT

Provided is an information processing device including an image analysis unit that analyzes content of an input image projected by a projection device, and a projection position determination unit that determines a projection area in a projection space onto which the input image is projected by the projection device on the basis of an analysis result obtained by analyzing the input image.

18 Claims, 24 Drawing Sheets

(51) Int. Cl.
  *H04N 5/14*    (2006.01)
  *G09G 5/377*   (2006.01)
  *G03B 37/00*   (2021.01)
  *G09G 5/00*    (2006.01)
  *G09G 5/36*    (2006.01)
  *G09G 5/37*    (2006.01)
  *G09G 5/38*    (2006.01)

(52) U.S. Cl.
  CPC .......... *G09G 5/00* (2013.01); *G09G 5/36* (2013.01); *G09G 5/37* (2013.01); *G09G 5/377* (2013.01); *G09G 5/38* (2013.01); *H04N 5/145* (2013.01); *H04N 5/147* (2013.01); *H04N 9/3179* (2013.01); *H04N 9/3194* (2013.01)

(58) Field of Classification Search
  CPC ...... G03B 21/00–64; G09G 5/37; G09G 5/38; H04N 9/3147; H04N 9/3185; H04N 9/3194; H04N 9/31–3197; H04N 13/00–398; G06F 3/011
  See application file for complete search history.

(56) References Cited

U.S. PATENT DOCUMENTS

| | | | |
|---|---|---|---|
| 9,268,520 B1* | 2/2016 | Cederlof | H04N 9/3194 |
| 2005/0041156 A1 | 2/2005 | Kondo et al. | |
| 2005/0195223 A1* | 9/2005 | Nitta | H04N 9/3105 |
| | | | 345/690 |
| 2007/0126864 A1 | 6/2007 | Bhat et al. | |
| 2007/0126938 A1* | 6/2007 | Tan | H04N 5/144 |
| | | | 348/739 |
| 2010/0201878 A1 | 8/2010 | Barenbrug et al. | |
| 2012/0223885 A1 | 9/2012 | Perez | |
| 2013/0181901 A1* | 7/2013 | West | G09G 5/14 |
| | | | 345/161 |
| 2016/0337626 A1* | 11/2016 | Mima | H04N 9/3185 |

FOREIGN PATENT DOCUMENTS

| | | |
|---|---|---|
| JP | 03-011227 U | 2/1991 |
| JP | 3011227 U | 5/1995 |
| JP | 2003-323170 A | 11/2003 |
| JP | 2007-159135 A | 6/2007 |
| JP | 2008-033136 A | 2/2008 |
| JP | 2009-180967 A | 8/2009 |
| JP | 2009-542039 A | 11/2009 |
| JP | 2011-118253 A | 6/2011 |
| JP | 2012-048066 A | 3/2012 |
| JP | 2015-041794 | 3/2015 |
| JP | 2015-041794 A | 3/2015 |
| JP | 2015-061241 A | 3/2015 |
| WO | 2003/092276 A1 | 11/2003 |
| WO | 2007/113754 A1 | 10/2007 |

OTHER PUBLICATIONS

Office Action for CN Patent Application No. 201680017803.5, dated Dec. 2, 2019, 08 pages of Office Action and 12 pages of English Translation.

Office Action for JP Patent Application No. 2017-509337, dated Nov. 19, 2019, 4 pages of Office Action and 3 pages of English Translation.

Office Action for CN Patent Application No. 201680017803.5, dated Jun. 30, 2020, 13 pages of Office Action and 17 pages of English Translation.

* cited by examiner

FIG. 15
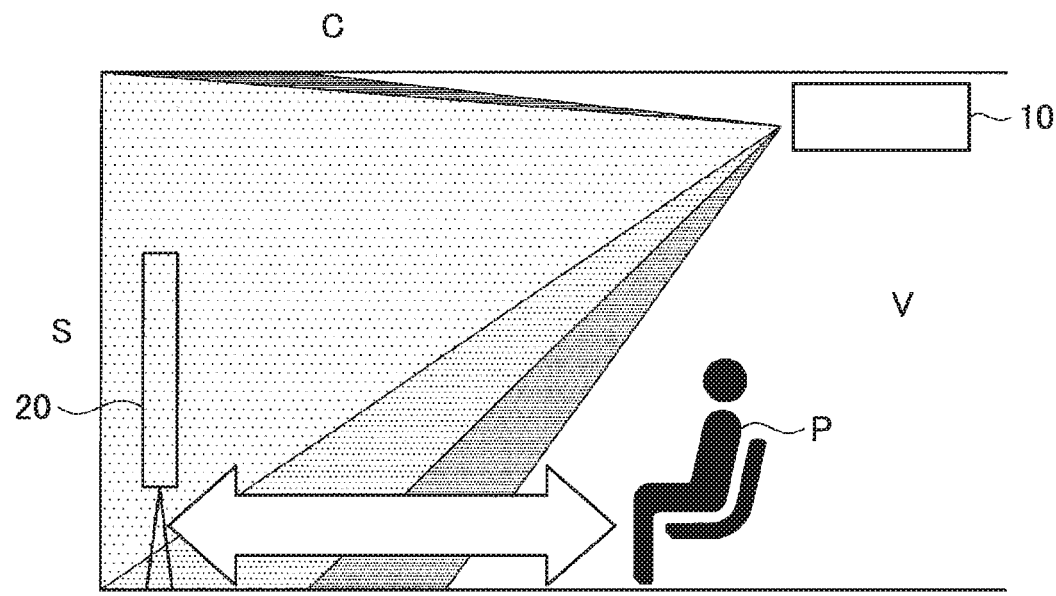
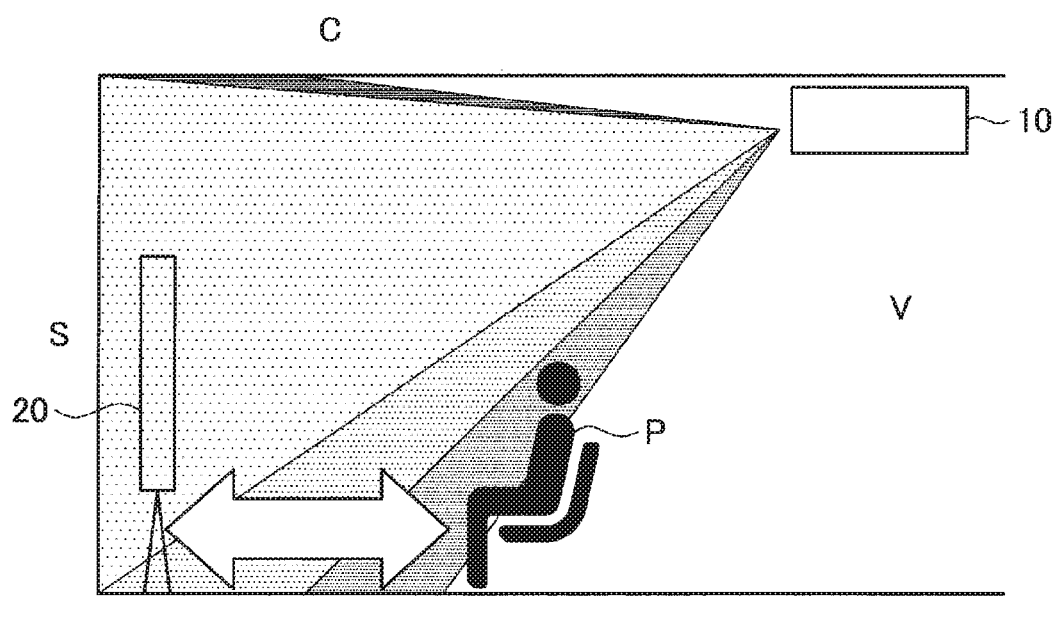

INFORMATION PROCESSING DEVICE, METHOD OF INFORMATION PROCESSING, AND IMAGE DISPLAY SYSTEM

CROSS REFERENCE TO RELATED APPLICATIONS

This application is a U.S. National Phase of International Patent Application No. PCT/JP2016/053087 filed on Feb. 2, 2016, which claims priority benefit of Japanese Patent Application No. JP 2015-072542 filed in the Japan Patent Office on Mar. 31, 2015. Each of the above-referenced applications is hereby incorporated herein by reference in its entirety.

TECHNICAL FIELD

The present disclosure relates to an information processing device, a method of information processing, a program, and an image display system.

BACKGROUND ART

With the recent increase in the size and resolution of display, opportunities for enjoying a high definition image on a large screen have increased even in ordinary homes. With regard to the types of display, not only a flat panel type such as liquid crystal but also a projection type such as a projector is widely spread. A projector in related art has a low resolution, brightness, and contrast, and so it is insufficient for home use. However, in recent years, a high-resolution type including 4K or a short focus type capable of projecting a large screen onto a wall surface has appeared, and so it has become possible to meet the potential needs of users.

Under such circumstances, systems have started to be developed for allowing the user to enjoy an image or the like in an environment in which a sense of presence or immersion is enhanced by displaying a game screen on a plat panel display and projecting a peripheral image onto wall surface, ceiling, floor, or the like by a projector. In one example, Patent Literature 1 discloses an immersive display system in which a user can enjoy a game that includes images superimposed on each other and projected onto a wall surface in a room. In such a system, a game image is displayed on a flat panel display arranged along a wall in front of the user, and an image outside the game image is projected onto the walls around the display while being extended. Thus, the user can enjoy playing the game while feeling as if the whole room is a game space, so the user can experience a high sense of presence or immersion.

Further, Patent Literature 2 discloses an image forming apparatus capable of projecting an image onto a wall portion in a direction to which the observer's face directs. This image forming apparatus sets a projection area on a wall portion in a direction to which the face is detected by the observer information detection means directs and projects the image onto the projection area. Furthermore, Patent Literature 3 discloses a projector capable of automatically adjusting the position and size of a projection image. This projector adjusts the position and size of the projection image on the basis of distance information from a shift control unit and a zoom control of the projection lens, and a movable distance sensor.

CITATION LIST

Patent Literature

Patent Literature 1: US2012-0223885A
Patent Literature 2: JP 2009-180967A
Patent Literature 3: JP 2008-033136A

DISCLOSURE OF INVENTION

Technical Problem

The technique disclosed in Patent Literature 1 fails to adjust the projection position and range depending on contents of an image, and so a sense of presence or immersion that the user can experience is likely to be limited. In addition, the technique disclosed in Patent Literature 2 can dynamically change the projection position and range, but the image can be projected only in the direction in which the user's line of sight is directed, and so a change in the projection position and range depending on contents of the image fail to be performed. The technique disclosed in Patent Literature 3 can also adjust the projection position or size, but this adjustment is performed on the basis of the distance information and so the adjustment depending on contents of the image fails to be performed.

In view of this, the present disclosure provides a novel and improved information processing device, method of information processing, program, and image display system, capable of providing an image that allows a user to experience high presence or immersion depending on contents of an image.

Solution to Problem

According to the present disclosure, there is provided an information processing device including: an image analysis unit configured to analyze a content of an input image projected by a projection device; and a projection position determination unit configured to determine a projection area in a projection space onto which the input image is projected by the projection device on the basis of an analysis result obtained by analyzing the input image.

Further, according to the present disclosure, there is provided a method of information processing, the method including: analyzing a content of an input image projected by a projection device; and determining a projection area in a projection space onto which the input image is projected by the projection device on the basis of an analysis result obtained by analyzing the input image.

Further, according to the present disclosure, there is provided a program for causing a computer to function as an information processing device including: an image analysis unit configured to analyze a content of an input image projected by a projection device; and a projection position determination unit configured to determine a projection area in a projection space onto which the input image is projected by the projection device on the basis of an analysis result obtained by analyzing the input image.

Further, according to the present disclosure, there is provided an image display system including: a projection device configured to project an image; an image analysis unit configured to analyze a content of an input image projected by the projection device; and a projection position determination unit configured to determine a projection area in a projection space onto which the input image is projected by the projection device on the basis of an analysis result obtained by analyzing the input image.

Advantageous Effects of Invention

According to the present disclosure as described above, it is possible to provide an image that allows the user to experience a high sense of presence or immersion depending on contents of the image. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 15 is a diagram illustrated to describe the structure of a projection space onto which an image is projected by an image display system and the arrangement of a projection device and a primary display device, according to a fourth embodiment of the present disclosure.

MODE(S) FOR CARRYING OUT THE INVENTION

Figure 1:
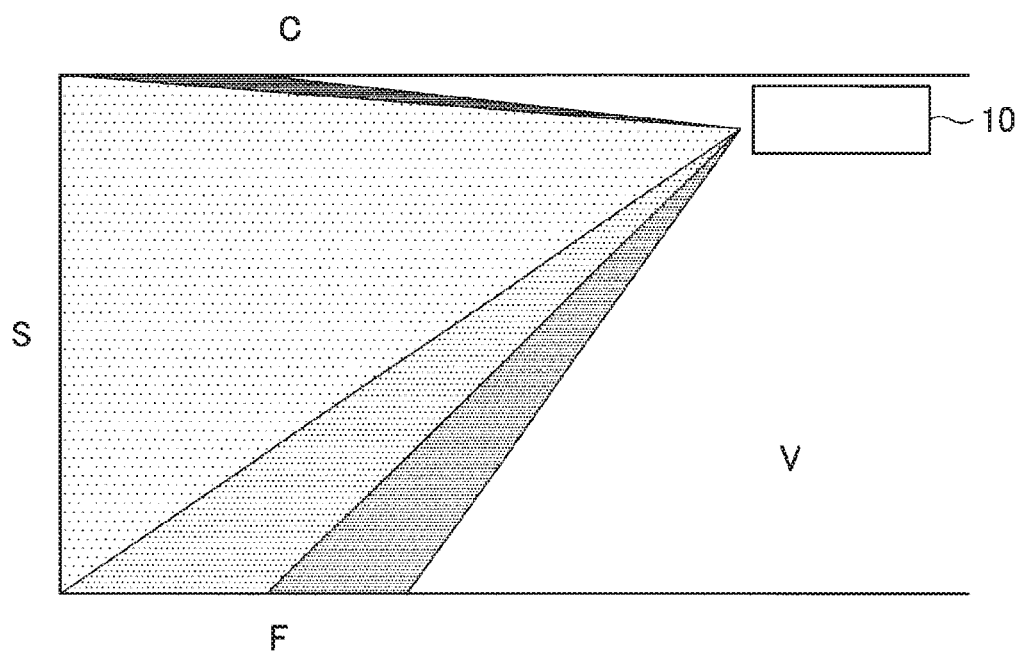
FIG. 1 is a diagram illustrated to describe the structure of a projection space onto which an image is projected by an image display system and the arrangement of a projection device, according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Moreover, the description will be given in the following order.
1. First embodiment (projection device)
1.1. Spatial configuration
1.2. Functional configuration of information processing device
1.3. Image display processing
2. Second embodiment (combination of projection device and primary display device)
2.1. Spatial configuration
2.2. Functional configuration of information processing device
2.3. Image display processing 3. Third embodiment (projection device and user position detection)
3.1. Spatial configuration
3.2. Functional configuration of information processing device
3.3. Image display processing
4. Fourth embodiment (combination of projection device and primary display device, and user position detection)
5. Emotional video generation
5.1. Functional configuration
5.2. Emotional video generation processing
6. Summary
7. Hardware configuration 1. First Embodiment The schematic configuration of an image display system according to a first embodiment of the present disclosure is now described with reference to FIGS. 1 to 7. The image display system according to the present embodiment analyzes contents of an image to be projected onto a space by a projection device such as a projector and determines a projection area of the image in the projection space depending on the contents of the image. In the present embodiment, the configuration and function of such an image display system in the case where the projection device projects and displays an image onto the space will be described.

[1.1. Spatial Configuration]

Figure 2:
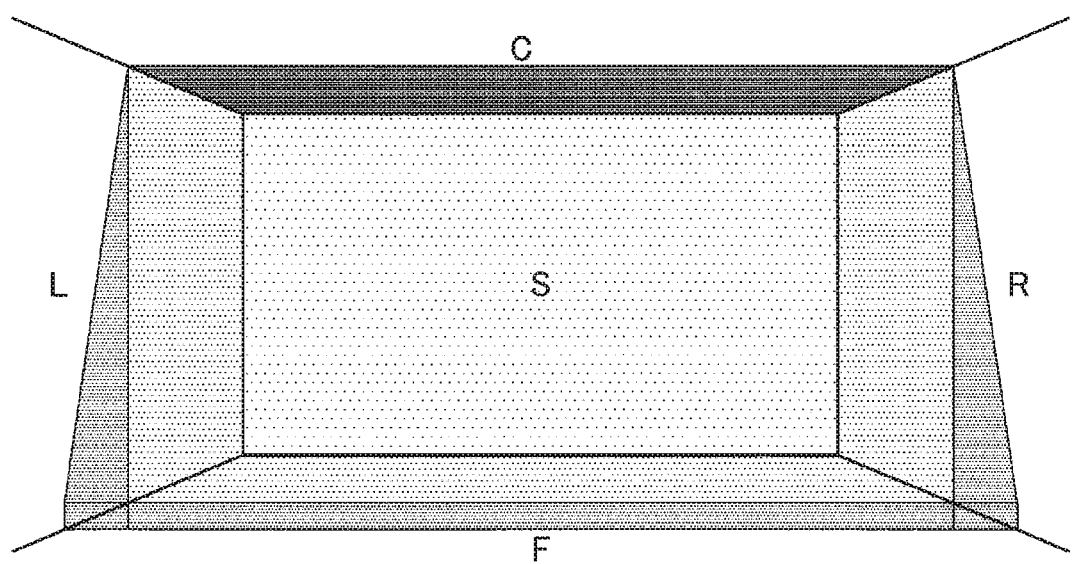
FIG. 2 is a diagram illustrated to describe a view of the projection space of FIG. 1 as viewed from the projection device side.
Figure 3:
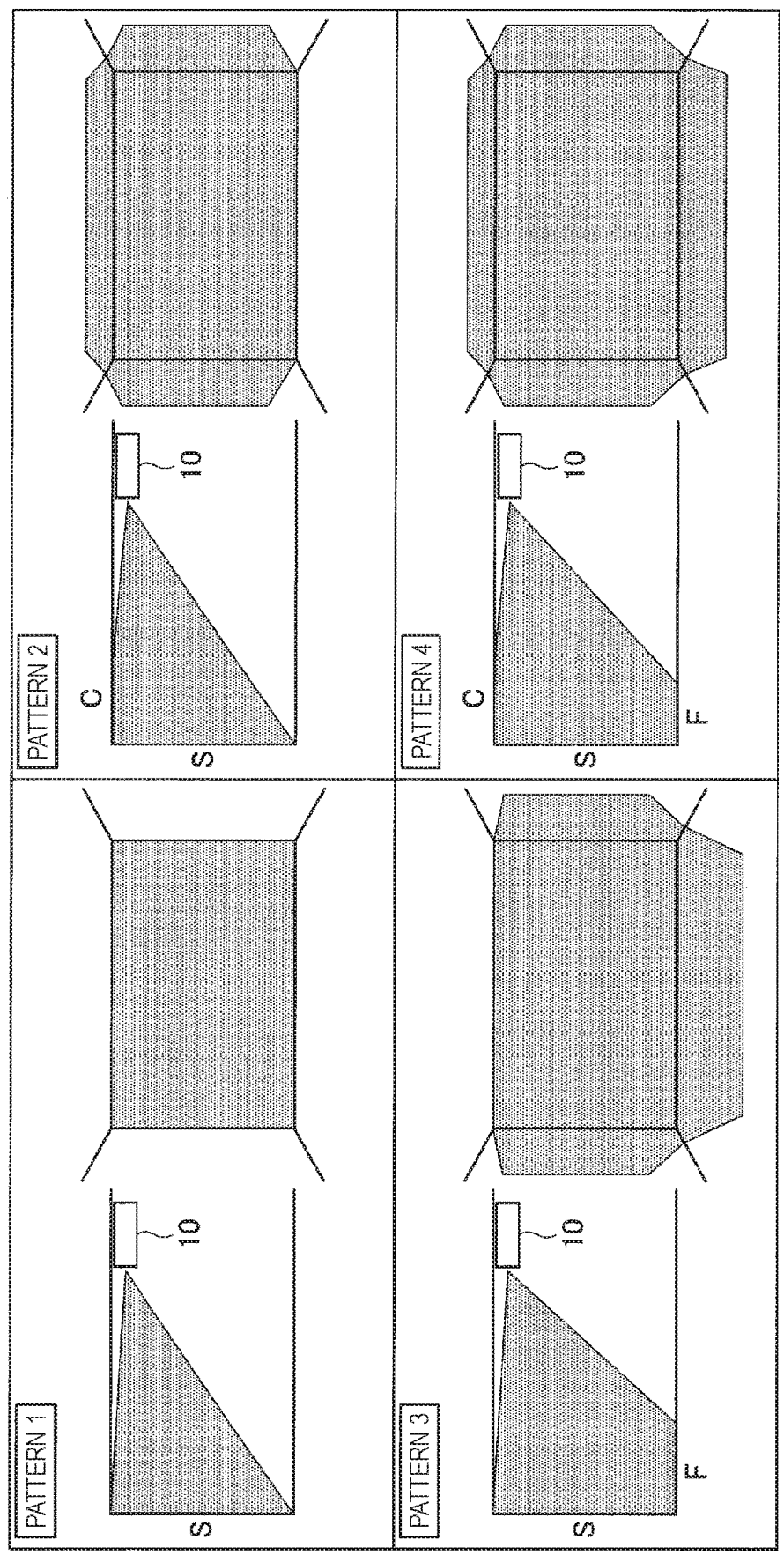
FIG. 3 is a diagram illustrated to describe a projection pattern of an image projected in the projection space.

The configuration of a space to which the image display system according to the present embodiment is applied is now described with reference to FIGS. 1 to 3. Moreover, FIG. 1 is a diagram illustrated to describe the structure of a projection space V onto which an image is projected by the image display system and the arrangement of a projection device 10, according to the present embodiment. FIG. 2 is a diagram illustrated to describe a view of the projection space V of FIG. 1 as viewed from the side of the projection device 10. FIG. 3 is a diagram illustrated to describe a projection pattern of an image projected onto the projection space V.

In the display system according to the present embodiment, the projection device 10 projects and displays an image onto the projection space. As illustrated in FIGS. 1 and 2, the projection space V is composed of a front S (hereinafter referred to as "S-plane") perpendicular to the projection direction of the projection device 10, a floor F (hereinafter referred to as "F-plane"), a ceiling C (hereinafter referred to as "C-plane"), and lateral sides L and R (hereinafter referred to as "L-plane" and "R-plane", respectively). In addition, the projection device 10 is installed on the ceiling C of the projection space V. Moreover, the projection device 10 may be installed at a position of predetermined height from the floor F.

The projection device 10 is capable of displaying images on the S-plane, the F-plane, the C-plane, the L-plane, and the R-plane, as illustrated in FIG. 1 and FIG. 2. How the projection device 10 projects an image onto each of the planes is determined by the position and setting of the projection device 10. In the image display system according to the present embodiment, the information processing device determines a plane onto which the image projects on the basis of the contents of the image and performs image processing so that the image projected onto each plane is appropriately displayed. An example of a projection area pattern of an image includes display (pattern 1) on only the front (S-plane), display (pattern 2) on the front (S-plane) and the ceiling (C-plane), display (pattern 3) on the front (S-plane) and the floor (F-plane), display (pattern 4) on the front (S-plane), the ceiling (C-plane), and the floor (F-plane), or the like, as illustrated in FIG. 3. In addition, a projection area pattern including display on the front (S-plane) and lateral sides (L-plane and R-plane), display on the whole plane (S-plane, C-plane, F-plane, L-plane, and R-plane), or the like may be set.

In one example, in a case where one of the contents of the image is a travel scene, it is easy to provide the viewer with a sense of presence or immersion by projecting it so that the viewer can view it widely from side to side. In this case, the information processing device projects the image onto the front (S-plane) and the lateral sides (L-plane and R-plane). In addition, in a case where one of the contents of the image is an attraction scene, the viewer, when looking downward, feels excitement. Thus, the image is projected onto the front (S-plane), the floor (F-plane), and the lateral sides (L-plane and R-plane). Furthermore, in a case where one of the contents of the image is a night sky scene, it is easy to provide the viewer with a sense of presence or immersion by projecting it so that the viewer can view it widely upward. In this case, the information processing device projects the image onto the front (S-plane), the ceiling (C-plane), and the lateral sides (L-plane and R-plane).

In this way, in the image display system according to the present embodiment, the change in the projection position or the projection range (projection area) depending on the contents of the image projected by the projection device 10 makes it possible for the viewer who views the image to experience a high sense of presence or immersion. The information processing device and its function in the image display system according to the present embodiment will be described below in detail.

[1.2. Functional Configuration of Information Processing Device]

Figure 4:
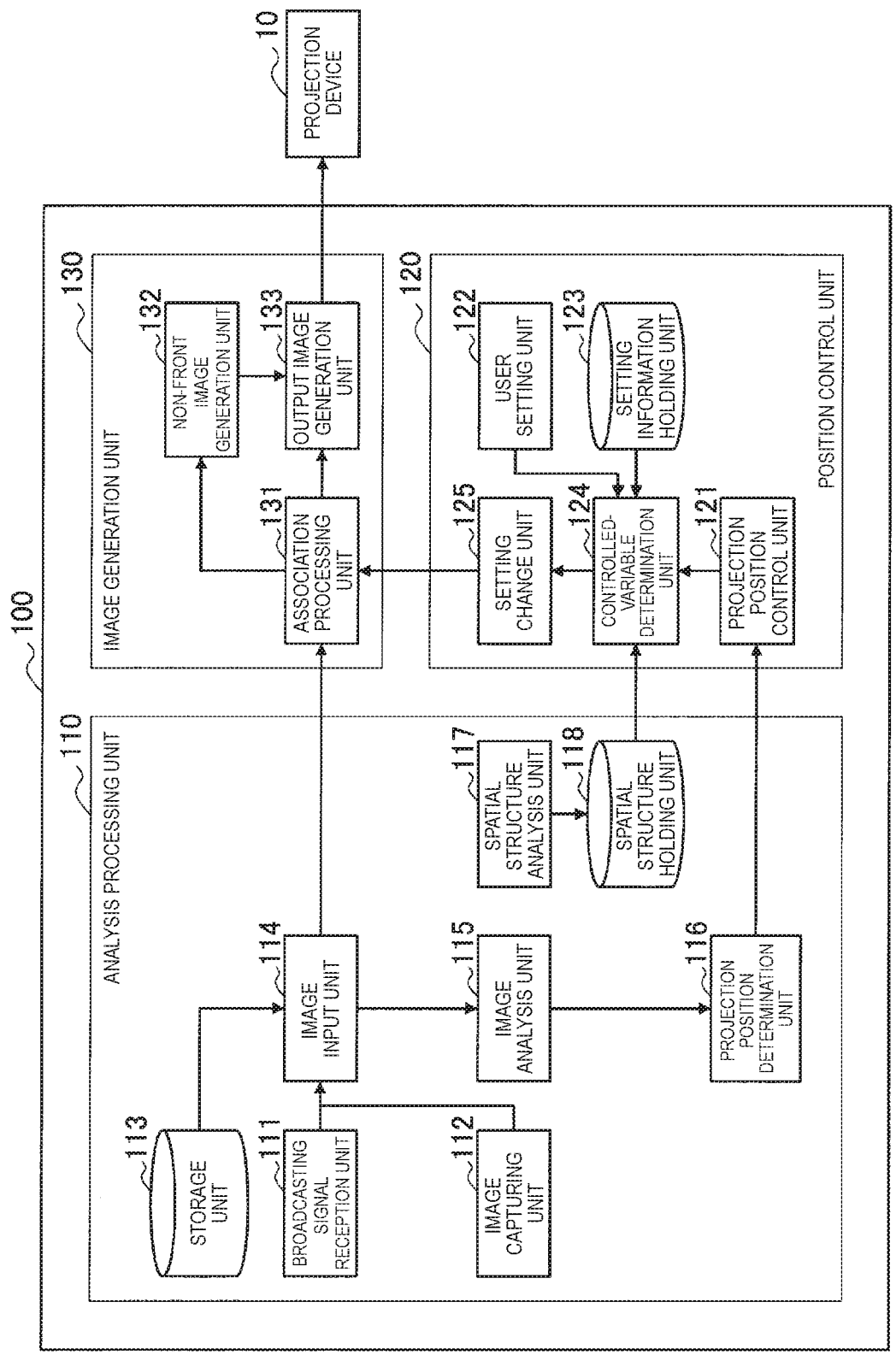
FIG. 4 is a functional block diagram illustrating a functional configuration of an information processing device according to the present embodiment.

The functional configuration of an information processing device 100 according to the present embodiment is now described with reference to FIG. 4. Moreover, FIG. 4 is a functional block diagram illustrating the functional configuration of the information processing device 100 according to the present embodiment.

The information processing device 100, which constitutes the image display system, is a device performs image processing for causing the projection device 10 to project and display an image onto a space. The information processing device 100 can be implemented as, in one example, a processing device such as a computer, a server communicably connected to the projection device 10 or a sensor for acquiring space information, or the like. The information processing device 100 according to the present embodiment is configured to include an analysis processing unit 110, a position control unit 120, and an image generation unit 130 as illustrated in FIG. 4.

(1) Analysis Processing Unit

The analysis processing unit 110 analyzes the contents of an image to be projected by the projection device 10 and analyzes the structure of a projection space to project the image. The analysis processing unit 110 is configured to include a broadcasting signal reception unit 111, an image capturing unit 112, a storage unit 113, an image input unit 114, an image analysis unit 115, a projection position determination unit 116, a spatial structure analysis unit 117, and a spatial structure holding unit 118.

The broadcasting signal reception unit 111, the image capturing unit 112, and the storage unit 113 are functional units that provide an image to be projected by the projection device 10. The broadcasting signal reception unit 111 receives a broadcasting signal from an external device, a server connected via a network, or the like. In addition, the image capturing unit 112 captures an image and generates an image signal. The storage unit 113 is a storage device that stores an image signal, in one example. The broadcasting signal reception unit 111, the image capturing unit 112, and the storage unit 113 output, in one example, a received broadcasting signal, a captured image signal, and a stored image signal by the user or an external device, respectively, to the image output unit 114 for projecting them by the projection device 10. Moreover, in the information processing device 100 according to the present embodiment, the analysis processing unit 110 includes the broadcasting signal reception unit 111, the image capturing unit 112, and the storage unit 113, but the present disclosure is not limited to this example, and the analysis processing unit 110 may be configured to include at least one of them.

The image input unit 114 outputs the broadcasting signal or the image signals received from the broadcasting signal reception unit 111, the image capturing unit 112, and the storage unit 113 to the image analysis unit 115 and the image generation unit 130 as an input image. Moreover, the broadcasting signal or the image signal, which is input to the image input unit 114 and is projected by the projection device 10, is also referred to as a "primary image signal" hereinafter.

The image analysis unit 115 analyzes a category of the contents of the primary image signal that is input from the image input unit 114. In the present embodiment, the projection area on which the image is projected in the projection space is determined on the basis of the contents of the image analyzed by the image analysis unit 115. In one example, the image analysis unit 115 analyzes a scene such as landscape, night sky, and attraction, as the contents of the image. The image analysis unit 115 outputs a result obtained by the analysis to the projection position determination unit 116.

The projection position determination unit 116 decides how to project an image suitably onto each of the S-plane, the F-plane, the C-plane, the L-plane, and the R-plane and determines the image, on the basis of the category of the image contents obtained by the image analysis unit 115. In one example, in a case where the image contents are the landscape, the image is projected onto each of the S-plane, the L-plane, and the R-plane so that the panorama can be viewed. In addition, in a case where the image contents are the night sky, the image is projected onto each of the S-plane, L-plane, R-plane, and C-plane so that even the sky projected onto the C-plane can be viewed. In a case where the image contents are the attraction, the image is projected onto each of the S-plane, the L-plane, the R-plane, and the F-plane so that even the image projected below can be viewed.

As described above, the relationship between the category of the image contents and the projection area of the mage in the projection space (i.e., the plane onto which the image is projected) is set previously and stored in the information processing device 100. The projection position determination unit 116, when determining the projection area of the image in the projection space from the category of the image contents, outputs the projection area of the determined image to the position control unit 120. Moreover, in a case where the input image has metadata such as an image captured by the user, it is also possible to determine the category of the image contents from the metadata.

The spatial structure analysis unit 117 acquires the positional relationship between the position of each of the S-plane, the F-plane, the C-plane, the L-plane, and the R-plane and the position of the projection device, and analyzes the structure of the space to be projected. In the spatial structure analysis unit 117, it may be performed, in one example, automatically on the basis of a detection result obtained by a depth sensor or a range finder installed in the projection space, or may be performed by the user's manual specification. The analysis result obtained by the spatial structure analysis unit 117 is recorded in the spatial structure holding unit 118.

(2) Position Control Unit

Next, the position control unit 120 controls the position and setting of the projection device 10. The position control unit 120 is configured to include a projection position control unit 121, a user setting unit 122, a setting information holding unit 123, a controlled-variable determination unit 124, and a setting change unit 125.

The projection position control unit 121 controls the position and setting of the projection device 10 so that an image is projected onto the projection area determined by the projection position determination unit 116. The projection position control unit 121 reports a projection area pattern that is input from the projection position determination unit 116 to the controlled-variable determination unit 124 to cause the controlled-variable determination unit 124 to calculate the controlled variable used to actually drive the projection device 10.

The user setting unit 122 receives input of setting information of the projection device 10 that is set by the user. The user can change the setting information of the projection device 10, in one example, using an operation device such as a remote controller. The setting information that is set by the user (hereinafter also referred to as "user setting information") is output to the controlled-variable determination unit 124.

The setting information holding unit 123 is a storage unit that holds setting information related to the attitude (XY), lens setting (zoom and shift), or the like of the projection device. When the setting of the projection device 10 is changed, the setting information holding unit 123 is referred to by the controlled-variable determination unit 124 to be described later and the information therein is read out.

The controlled-variable determination unit 124 determines a setting controlled variable of the projection position of the projection device 10 on the basis of the information acquired from the spatial structure holding unit 118, the projection position control unit 121, and the setting information holding unit 123. In one example, the controlled-variable determination unit 124, when receiving an instruction to project an image onto each of the S-plane, the L-plane, and the R-plane from the projection position control unit 121, acquires specific position information of the S-plane, the L-plane, and the R-plane in the projection space on the basis of an analysis result of the spatial structure stored in the spatial structure holding unit 118. Then, the controlled-variable determination unit 124 acquires the setting information of the projection device 10 that is used to be the specified projection state of the image from the setting information holding unit 123 and calculates a variation from the current setting information of the projection device 10. The controlled-variable determination unit 124 determines the setting controlled variable on the basis of this variation.

In addition, the controlled-variable determination unit 124, when receiving the user setting information from the user setting unit 122, appropriately corrects the setting information related to the attitude, lens setting, or the like of the projection device 10 on the basis of the user setting information. The controlled-variable determination unit 124 outputs the finally obtained setting to the setting change unit 125.

The setting change unit 125 changes the attitude, the lens setting, or the like of the projection device 10 on the basis of the setting controlled variable that is input from the controlled-variable determination unit 124. The setting controlled variable that is set is held in the setting information holding unit 123. When a change in settings of the various mechanisms of the projection device 10 are completed, the setting change unit 125 outputs the setting controlled variable of the projection device 10 to the image generation unit 130.

(3) Image Generation Unit

The image generation unit 130 generates a projection image to be projected actually by the projection device 10 from the primary image signal. The image generation unit 130 is configured to include an association processing unit 131, a non-front image generation unit 132, and an output image generation unit 133.

The association processing unit 131 specifies an image area to be projected onto each of the S-plane, the F-plane, the C-plane, the L-plane, and the R-plane from the input image that is input through the image input unit 114 on the basis of the input image and the setting controlled variable from the setting change unit 125. In other words, each plane of the projection space is associated with the image area of the input image displayed on these planes. Here, among the input images, a portion of the image area projected onto the S-plane is set to a front image, and a portion of the image area projected onto a plane other than the S-plane is set to a non-front image. In other words, the association processing unit 131 verifies whether which image area of the input image is associated with the front image or the non-front image.

The association processing unit 131 extracts an image area corresponding to the specified non-front image from the input image and outputs it to the non-front image generation unit 132. In addition, the association processing unit 131 extracts an image area corresponding to the specified front image from the input image and outputs it to the output image generation unit 133.

The non-front image generation unit 132 performs image processing on the image area that is set as a non-front image in the association processing unit 131 so that an image is appropriately displayed on the projection plane. In one example, geometric correction image processing, interpolation image processing, correlation image processing, or the like is performed. The geometric correction image processing generates an image subjected to necessary image processing such as geometric correction so as to be suitable for projection onto the F-plane, the C-plane, the L-plane, and the R-plane. The interpolation image processing generates an image interpolated from the front image, and the correlation image processing generates an image correlated with the front image. The non-front image generation unit 132 outputs the non-front image generated by performing necessary processing to the output image generation unit 133.

The output image generation unit 133 generates an output image to be projected from the projection device 10 on the basis of the front image and the non-front image. The combination of the front image and the non-front image is not limited to a particular mode, and they may be combined without any modification or the boundary areas of both images may be blurred or overlapped. The output image generated by the output image generation unit 133 is output to the projection device 10 and is projected onto the projection space.

[1.3. Image Display Processing]

Figure 5:
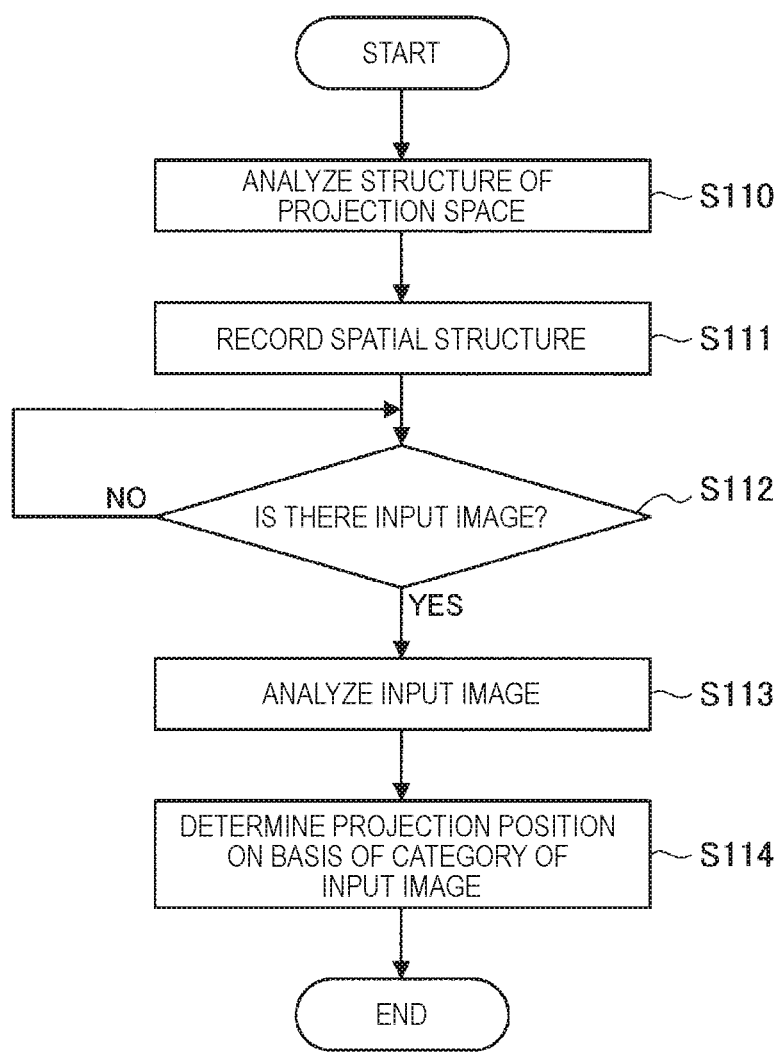
FIG. 5 is a flowchart illustrating analysis processing by the information processing device according to the present embodiment.
Figure 6:
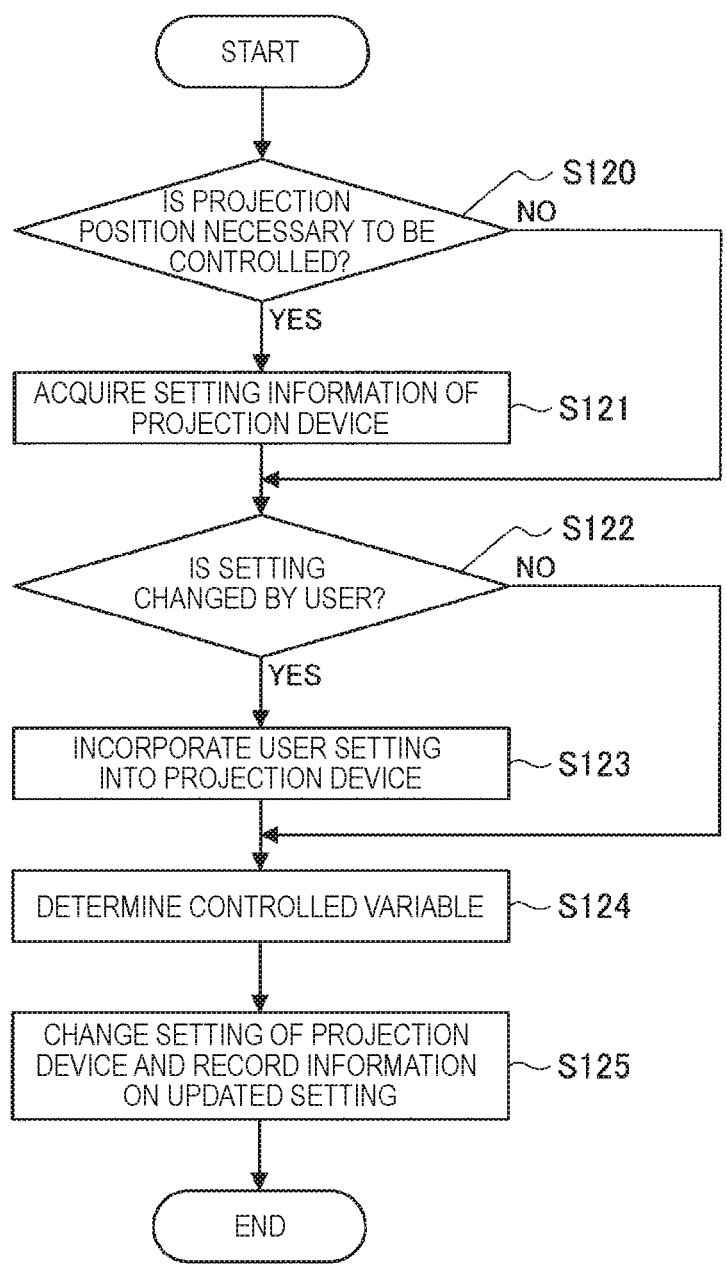
FIG. 6 is a flowchart illustrating position control processing of controlling a position of the projection device by the information processing device according to the present embodiment.
Figure 7:
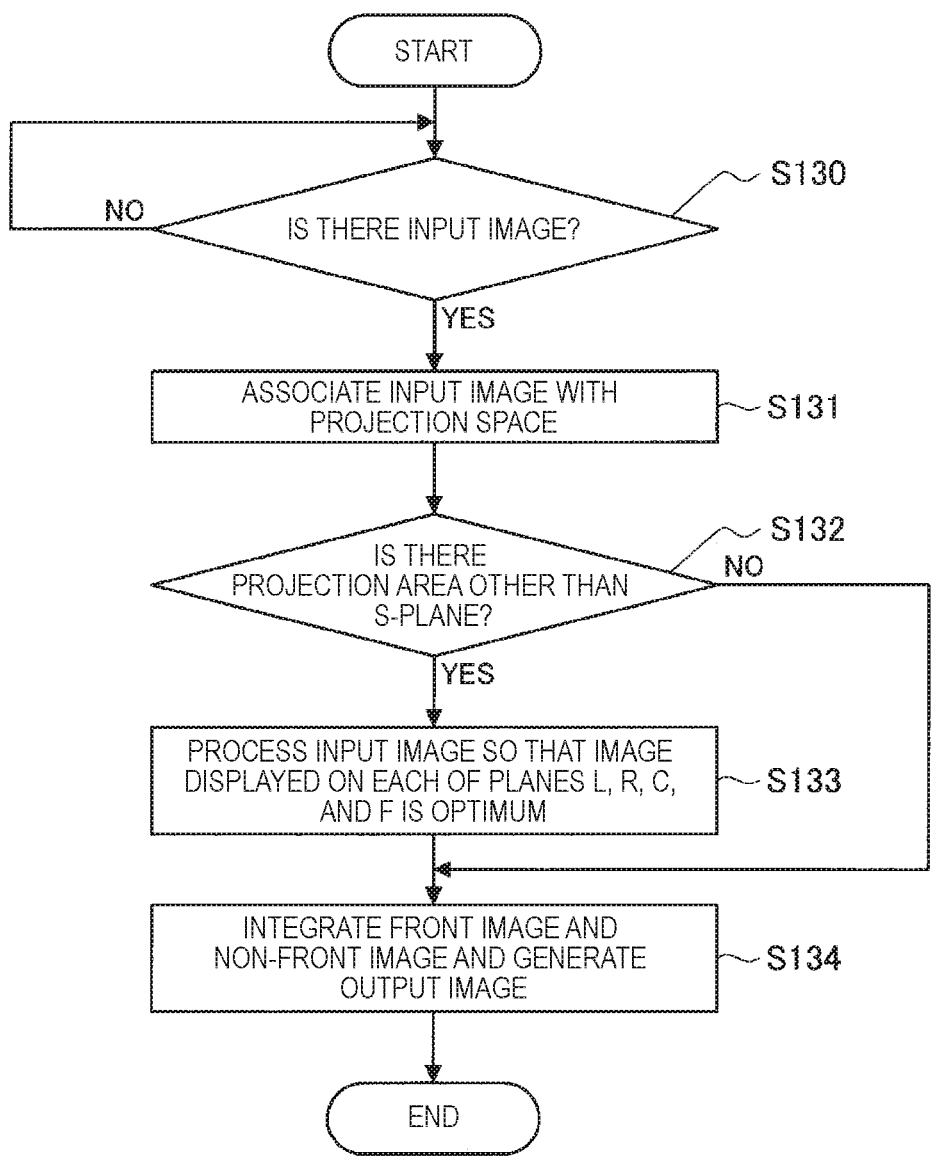
FIG. 7 is a flowchart illustrating image generation processing by the information processing device according to the present embodiment.

Next, the image display processing performed by the information processing device 100 according to the present embodiment is described with reference to FIGS. 5 to 7. Moreover, FIG. 5 is a flowchart illustrating the analysis processing performed by the information processing device 100 according to the present embodiment. FIG. 6 is a flowchart illustrating the position control processing of the projection device 10 performed by the information processing device 100 according to the present embodiment. FIG. 7 is a flowchart illustrating the image generation processing performed by the information processing device 100 according to the present embodiment.

(1) Analysis Processing

In the image display processing according to the present embodiment, the analysis processing unit 110 first performs analysis processing on an image and space as illustrated in FIG. 5. In the analysis processing, first, as illustrated in FIG. 5, the spatial structure analysis unit 117 analyzes the structure of the projection space onto which the image is projected by the projection device 10 (S110). The spatial structure analysis unit 117 acquires the position of each of the S-plane, the F-plane, the C-plane, the L-plane, and the R-plane that constitute the projection space and the position of the projection device 10 in the projection space, and analyzes the positional relationship between these planes and the projection device 10. The position of each plane and the position of the projection device 10 may be performed, in one example, automatically on the basis of the detection result obtained by a depth sensor, a range finder, or the like installed in the projection space, or may be performed by the user's manual specification. The spatial structure of the projection space analyzed in step S110 is recorded in the spatial structure holding unit 118 (S111).

Subsequently, it is determined whether an image is input to the image input unit 114 (S112). The primary image signal including a broadcasting signal received by the broadcasting signal reception unit 111, an image signal captured by the image capturing unit 112, or an image signal previously stored in the storage unit 113 is input to the image input unit 114. The processing of step S112 is repeatedly executed until the primary image signal is input to the image input unit 114.

When the primary image signal is input to the image input unit 114, the image analysis unit 115 analyzes the input image (S113). In analyzing the input image in step S113, it is determined what kind of category the contents of the input image belong to. As described above, an example of the category of the image contents includes landscape, night sky, attraction, or the like. Moreover, well-known methods may be applied to the image analysis processing.

Then, the projection position determination unit 116 determines the projection area in the projection space onto which the input image is projected on the basis of the analysis result obtained in step S113 (S114). The projection position determination unit 116 first determines whether the analysis result corresponds to a preset category. If there is a corresponding category, it is determined to display the input image on the projection area optimum for the preset category. In one example, in the case where the image contents are the landscape, the image is projected onto each of the S-plane, the L-plane, and the R-plane so that the panorama can be viewed. In addition, in the case where the image contents are the night sky, the image is projected onto each of the S-plane, L-plane, R-plane, and C-plane so that even the sky projected onto the C-plane can be viewed. Then, in the case where the image contents are the attraction, the image is projected onto each of the S-plane, the L-plane, the R-plane, and the F-plane so that even the image projected below onto the F-plane can be viewed.

On the other hand, if there is no result corresponding to the preset category, the projection position determination unit 116 may set the projection area of the input image to, in one example, the same as a specific category or a preset default projection area. The projection area of the input image determined in this way is output to the position control unit 120.

(2) Position Control Processing

Subsequently, the position control processing of the projection device 10 is described with reference to FIG. 6. In the position control processing of the projection device 10, first, as illustrated in FIG. 6, it is determined whether it is necessary for the projection device 10 to control the projection position of the image depending on the projection area of the input image (S120). The projection position control unit 121 determines whether the current setting state of the projection device 10 is necessary to be changed so that the input image is projected onto the projection area determined in step S114 of FIG. 5.

If it is determined in step S120 that the setting information of the projection device 10 is necessary to be changed, the controlled-variable determination unit 124 acquires the setting information of the projection device 10 from the setting information holding unit 123 (S121). In one example, the controlled-variable determination unit 124, when receiving an instruction to project an image onto each of the S-plane, the L-plane, and the R-plane from the projection position control unit 121, acquires specific position information of the S-plane, the L-plane, and the R-plane in the projection space on the basis of the analysis result of the spatial structure stored in the spatial structure holding unit 118. Then, the controlled-variable determination unit 124 acquires the setting information of the projection device 10 used to set it to the specified projection state of the image from the setting information holding unit 123. Moreover, if it is determined in step S120 that the setting information of the projection device 10 is unnecessary to be changed, it is determined to maintain the current setting information, and the processing proceeds to step S122.

Subsequently, the controlled-variable determination unit 124 determines whether the user changes the setting information (S122). If the user changes the setting information, the user setting information is input to the user setting unit 122. The controlled-variable determination unit 124 corrects the setting information related to the attitude, the lens setting, or the like of the projection device that is acquired in steps S120 and S121 on the basis of the user setting information (S123). This incorporates the user's preference or the like into the setting information automatically adjusted. Moreover, if there is no input of the user setting information in step S122, the processing proceeds to step S124.

Then, the controlled-variable determination unit 124 determines the setting controlled variable of the projection position of the projection device 10 from the setting information of the projection device 10 that is determined through the processing in steps S120 to S123 (S124). The controlled-variable determination unit 124, when calculating the setting controlled variable indicating how much the projection position of the projection device 10 is to be controlled, records the setting information in the setting information holding unit 123. In addition, the setting change unit 125 changes the attitude, the lens setting, or the like of the projection device 10 on the basis of the calculated setting controlled variable (S125). Then, the setting change unit 125 determines whether a change of the setting information of the projection device 10 is completed. If a change of the setting information is completed, the setting change unit 125 outputs the setting controlled variable to the image generation unit 130, and then the processing ends.

(3) Image Generation Processing

Subsequently, the generation processing of the output image to be projected by the projection device 10 is described with reference to FIG. 7. As illustrated in FIG. 7, the image generation processing is started when the association processing unit 131 receives an input image from the analysis processing unit 110 (S130). The processing of step S130 is repeatedly performed until an input image is input.

If the input image is input, the association processing unit 131 associates the input image with the projection space (S131). The association processing unit 131 specifies the image area projected onto each of the S-plane, the F-plane, the C-plane, the L-plane, the R-plane from the input image on the basis of the input image from the image input unit 114 and the setting controlled variable from the setting change unit 125. In other words, the association processing unit 131 verifies whether which image area in the input image corresponds to the front image or the non-front image.

The image projected in the projection space by the projector 10 is different in appearance between the front (S-plane) that is a plane perpendicular to the projection direction of the projection device 10 and the other planes (F-plane, C-plane, L-plane, and R-plane). This occurs because the position or inclination angle of each plane with respect to the projection device 10 is different. The image generation unit 130 according to the present embodiment performs the image processing for providing an image on the input image without causing discomfort on all planes onto which the image is projected. The association processing unit 131 specifies the front image and the non-front image from the input image in step S131 to perform this image processing.

Subsequently, the association processing unit 131 determines whether the input image is projected onto a plane (i.e., F-, C-, L-, or R-plane) other than the front (S-plane) (S132). In one example, in the case where a non-front image is specified in step S131, the association processing unit 131 can determine that the input image is projected onto a plane other than the front. If it is determined in step S132 that the input image is projected onto a plane other than the front, the non-front image generation unit 132 performs the image processing so that the non-front image displayed on such plane is optimum (S133).

The non-front image generation unit 132 performs, in one example, geometric correction image processing, interpolation image processing, correlation image processing, or the like. The geometric correction image processing generates an image subjected to necessary image processing including geometric correction to be suitable for projection onto the F-plane, the C-plane, the L-plane, and the R-plane. The interpolation image processing generates an image interpolated from the front image. The correlation image processing generates an image correlated with the front image. The non-front image generation unit 132 outputs the non-front image generated by performing necessary processing to the output image generation unit 133. Moreover, if it is determined in step S132 that the input image is displayed only on the front (S-plane), the processing proceeds to step S134 without performing the processing of step S133.

Then, the output image generation unit 133 integrates the front image and the non-front image and generates an output image to be projected from the projection device 10 (S134). In one example, the front image and the non-front image may be combined without any modification, or the boundary areas of the two images may be blurred or overlapped. The output image generated by the output image generation unit 133 is output to the projection device 10 and is projected onto the projection space.

The configuration and function of the image display system according to the first embodiment of the present disclosure are described above. According to the present embodiment, the projection area of the input image in the projection space is determined depending on the contents of the image projected onto the projection space by the projection device. This makes it possible to provide the user with a high sense of presence or immersion.

2. Second Embodiment

The schematic configuration of an image display system according to a second embodiment of the present disclosure is now described with reference to FIGS. 8 to 11. The image display system according to the present embodiment analyzes the contents of an image projected onto a space by a projection device such as a projector and determines a projection area of an image in a projection space depending on the contents of the image, which is similar to the first embodiment. However, the difference between the two is that a primary display device is arranged in the projection space.

[2.1. Spatial Configuration]

Figure 8:
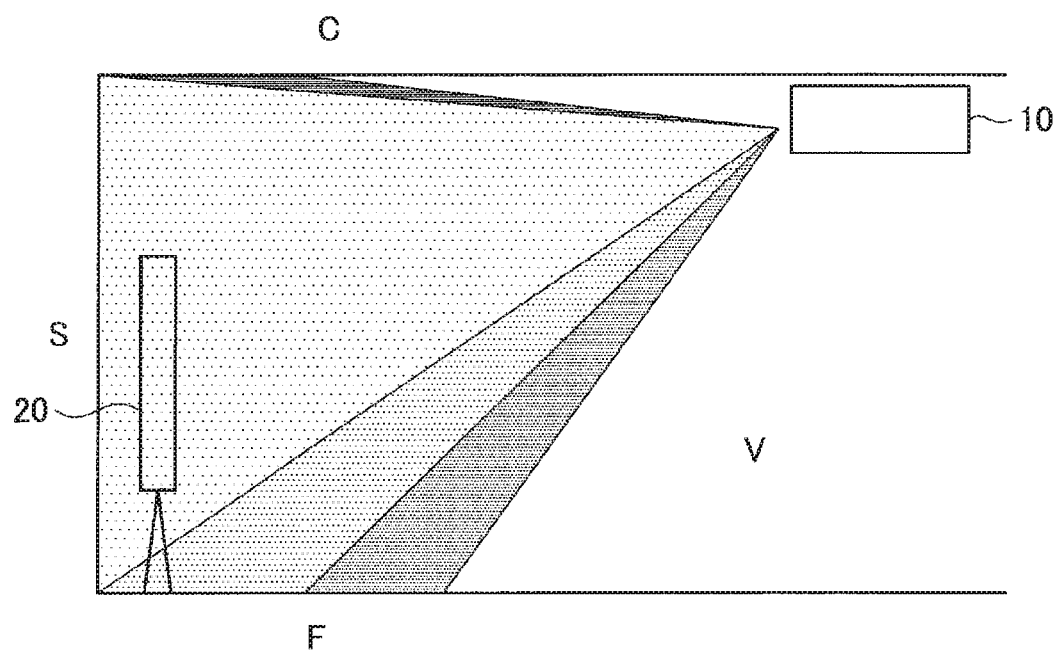
FIG. 8 is a diagram illustrated to describe the structure of a projection space onto which an image is projected by an image display system and the arrangement of a projection device and a primary display device, according to a second embodiment of the present disclosure.
Figure 9:
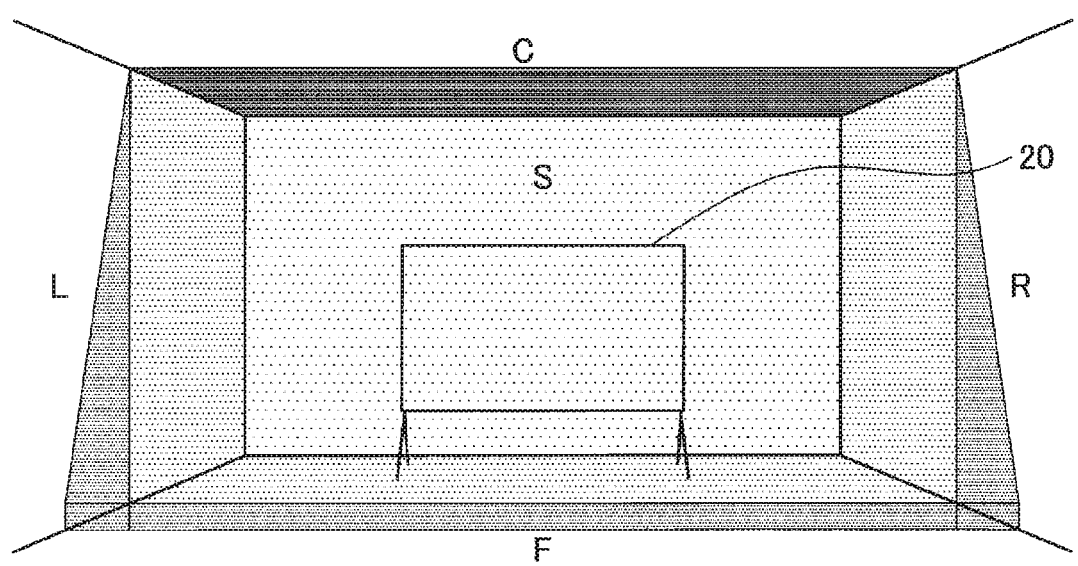
FIG. 9 is a diagram illustrated to describe a view of a projection space in which the primary display device of FIG. 8 is arranged as viewed from the projection device side.

FIG. 8 is a diagram illustrated to describe the structure of the projection space V onto which the image is projected by the image display system and the arrangement of the projection device 10 and a primary display device 20, according to the present embodiment. FIG. 9 is a diagram illustrated to describe a view of the projection space V in which the primary display device 20 of FIG. 8 is arranged as viewed from the side of the projection device 10.

The primary display device 20 is, in one example, a panel display device having a 4K2K resolution and can provide a high-resolution image to the user. Such a primary display device 20 is installed, in one example, in front of the front (S-plane). Moreover, although the primary display device 20 is provided at the center of the S-plane in FIG. 9, the present disclosure is not limited to this example, and the arrangement is not limited as long as the primary display device 20 is disposed so that the back surface of the primary display device 20 faces the S-plane. In addition, in FIG. 8, the projection device 10 is installed on the ceiling (C-plane), but it may be installed on the floor (F-plane) or installed at a fixed height position from the floor (F-plane).

When the image is projected using the projector 10 in the state illustrated in FIG. 8, the images are projected onto five places, that is, the front (S-plane), the ceiling (C-plane), the floor (F-plane), the left side (L-plane), and the right side (R-plane), as illustrated in FIG. 9. In addition, in the case of the present embodiment, the image that is input without any modification from the image input unit 114 may be displayed on the primary display device 20 in some cases. At this event, the projection device 10 projects a peripheral image that is not displayed on the primary display device 20. In this way, the image is output by combining the primary display device 20 and the projection device 10, and thus it is possible to provide the user with a high sense of presence or immersion.

The following description will be given by focusing on the difference from the image display system according to the first embodiment in that the primary display device 20 is arranged in the S-plane, but the component having the same configuration and function as those of the first embodiment is not described in detail.

[2.2. Functional Configuration of Information Processing Device]

Figure 10:
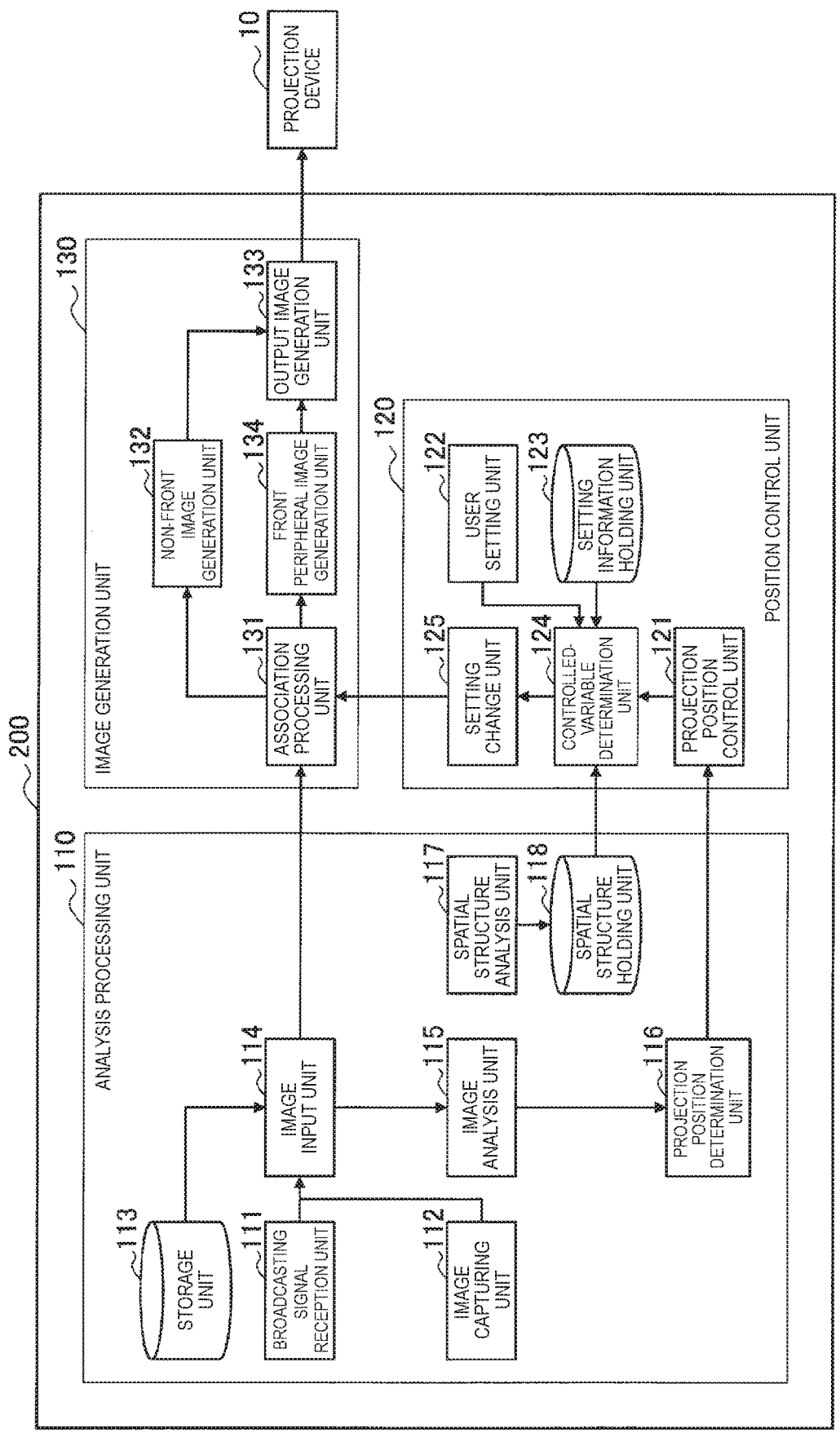
FIG. 10 is a functional block diagram illustrating a functional configuration of an information processing device according to the present embodiment.

The functional configuration of an information processing device 200 according to the present embodiment is now described with reference to FIG. 10. Moreover, FIG. 10 is a functional block diagram illustrating the functional configuration of the information processing device 200 according to the present embodiment. The information processing device 200 according to the present embodiment is configured to include the analysis processing unit 110, the position control unit 120, and the image generation unit 130, which is similar to the first embodiment. The information processing device 200 according to the present embodiment is different from the information processing device 100 according to the first embodiment is that the image generation unit 130 is provided with a front peripheral image generation unit 134.

The front peripheral image generation unit 134 generates, as a front peripheral image, a portion other than the image area corresponding to the display surface portion of the primary display device 20 from the front image projected onto the front (S-plane) among the input images. As illustrated in FIG. 9, the primary display device 20 is arranged in the projection space V according to the present embodiment. In the present embodiment, at least a part of the input image is displayed on the primary display device 20, and the image projected by the projection device 10 is displayed on the peripheral surface of the display surface of the primary display device 20. Moreover, the input image may be displayed only on the primary display device 20 in some cases. In this case, an example of the image projected by the projection device 10 includes an emotional video or the like to be described later.

In this way, in the case where the primary display device 20 is arranged in the projection space V, a portion corresponding to the display surface of the primary display device 20 is excluded from the image projected onto the front (S-plane) by the projection device 10 so that the image does not interfere with the input image displayed on the primary display device 20. The front peripheral image generation unit 134 generates an image to be projected onto the front (S-plane) by the projection device 10. Moreover, in the present embodiment, an image displayed on the primary display device 20 is referred to as a "primary display image", and an image projected onto the S-plane other than the primary display device 20 is referred to as a "front peripheral image". As described above, in the case where the input image is displayed only on the primary display device 20, the primary display image is the input image itself.

The front peripheral image generation unit 134 performs predetermined processing on an area that is extracted as being associated with the front peripheral image in the association processing unit 131. In one example, the front peripheral image generation unit 134 performs geometric correction image processing, interpolation image processing, correlation image processing, or the like. The geometric correction image processing generates an image subjected to necessary image processing including geometric correction to be suitable as a peripheral image of the primary display image. The interpolation image processing generates an image interpolated from the primary display image. The correlation image processing generates an image correlated with the primary display image. The front peripheral image generation unit 134 outputs the generated front peripheral image generated by performing the necessary processing to the output image generation unit 133. Thus, the output image that is output from the output image generation unit 133 is obtained by combining the non-front image generated by the non-front image generation unit 132 with the front peripheral image generated by the front peripheral image generation unit 134.

The configurations of other functional units of the information processing device 200 are the same as those of the information processing device 100 according to the first embodiment illustrated in FIG. 4, and thus the description thereof will be omitted herein.

[2.3. Image Display Processing]

Figure 11:
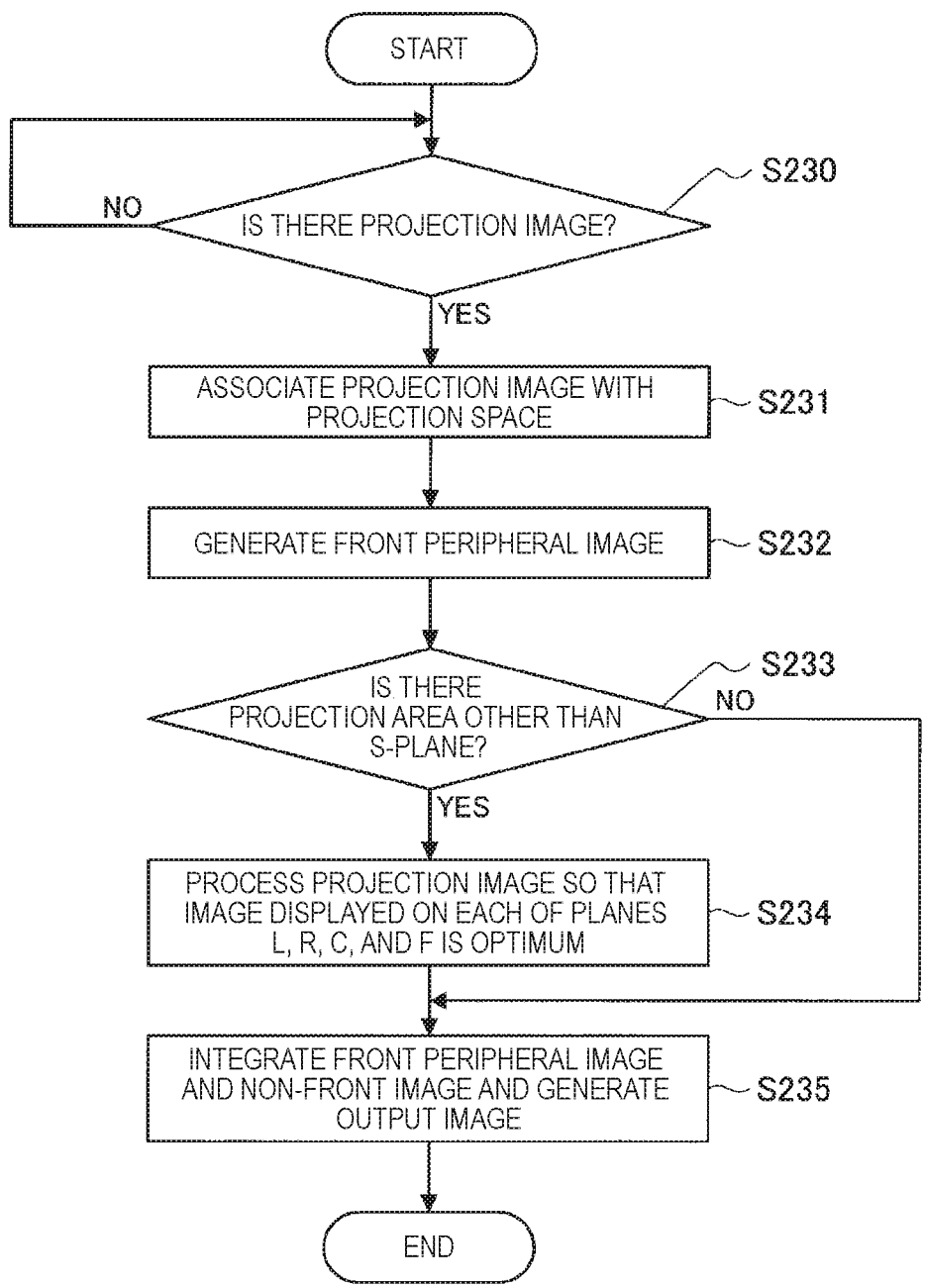
FIG. 11 is a flowchart illustrating image generation processing by the information processing device according to the present embodiment.

Next, the image display processing by the information processing device 200 according to the present embodiment is described. The image display processing according to the present embodiment includes analysis processing, position control processing of the projection device 10, and image generation processing, which is similar to the first embodiment. In the image display processing according to the present embodiment, the primary display device 20 is arranged in the projection space V, and thus spatial structure analysis in the analysis processing and front peripheral image generation in the image generation processing are newly added, as compared with the first embodiment. Moreover, the position control processing of the projection device 10 is similar to the processing illustrated in FIG. 6, and so the analysis processing and the image generation processing according to the present embodiment are described below with reference to FIG. 11. Moreover, FIG. 11 is a flowchart illustrating the image generation processing by the information processing device 200 according to the present embodiment.

(1) Analysis Processing

Although the analysis processing according to the present embodiment is the same in procedure as the analysis processing according to the first embodiment illustrated in FIG. 5, the processing details in step S100 are different. In other words, the spatial structure analysis unit 117 analyzes the structure of the projection space where the image is projected by the projection device 10, and analyzes the positional relationship between the projection space and the primary display device 20 (S110). First, the spatial structure analysis unit 117 acquires the position of each of the S-plane, the F-plane, the C-plane, the L-plane, and the R-plane that constitute the projection space and the position of the projection device 10 in the projection space, and analyzes the positional relationship between these planes and the projection device 10. The position of each plane and the position of the projection device 10 may be performed, in one example, automatically on the basis of the detection result obtained by a depth sensor, a range finder, or the like installed in the projection space, or may be performed by the user's manual specification.

In addition, the spatial structure analysis unit 117 analyzes the positional relationship between the primary display device 20 and each plane that constitutes the projection space. In this case, the spatial structure analysis unit 117 may acquire at least the positional relationship with the surface including the display surface of the primary display device 20 as viewed from the projection device 10. In one example, in FIG. 9, the display surfaces of the primary display device 20 are all included in the S-plane, so the spatial structure analysis unit 117 acquires the positional relationship between the primary display device 20 and the S-plane. The spatial structure of the projection space analyzed in step S110 and the positional relationship with the primary display device 20 are recorded in the spatial structure holding unit 118 (S111).

Subsequently, it is determined whether an image is input to the image input unit 114 (S112). The primary image signal including a broadcasting signal received by the broadcasting signal reception unit 111, an image signal captured by the image capturing unit 112, or an image signal previously stored in the storage unit 113 is input to the image input unit 114. The processing of step S112 is repeatedly executed until the primary image signal is input to the image input unit 114.

The step S113 and the subsequent processing are similar to those of the first embodiment. When the primary image signal is input to the image input unit 114, the image analysis unit 115 analyzes the input image (S113). If it is determined what kind of category the contents of the input image belong to, the projection position determination unit 116 determines the projection area in the projection space where the input image is projected (S114).

(2) Image Generation Processing

Subsequently, the generation processing of an output image projected by the projection device 10 is described with reference to FIG. 11. The image generation processing according to the present embodiment is also substantially the same as the image generation processing according to the first embodiment illustrated in FIG. 7, but the difference is that a front peripheral image is generated and an output image is obtained by combining the front peripheral image with the non-front image. In addition, the image to be processed by the image generation unit 130 is the image to be projected by the projection device 10. However, in the present embodiment, an input image that is input from the image input unit 14 is displayed on the primary display device 20, and an image different from the input image (e.g., an emotional video generated from an input image, as described later) is displayed on the other planes. The image different from the input image is referred to as a projection image in the present embodiment.

The image generation processing according to the present embodiment is started when the association processing unit 131 receives an input of the projection image as illustrated in FIG. 11 (S230). The processing of step S230 is repeatedly performed until the projection image is input. If the projection image is input, the association processing unit 131 associates the projection image with the projection space (S231). The processing of step S231 is performed in a similar way to that of step S131 of FIG. 7. The association processing unit 131 specifies an image area to be projected onto each of the S-plane, the F-plane, the C-plane, the L-plane, and the R-plane from the projection image on the basis of the projection image from the image input unit 114 and the setting controlled variable from the setting change unit 125.

In addition, the association processing unit 131 generates a front peripheral image to be projected by the projection device 10 onto the front (S-plane) of the surroundings of the primary display device 20 in consideration of the primary display image displayed on the primary display device 20. The association processing unit 131 specifies the area of the front peripheral image obtained by excluding the portion corresponding to the display surface of the primary display device 20 from the image area of the projection image projected onto the S-plane in step S231.

Subsequently, the front peripheral image generation unit 134 performs predetermined processing on the area of the front peripheral image specified in step S231 to generate the front peripheral image (S232). The front peripheral image generation unit 134 performs, in one example, geometric correction image processing, interpolation image processing, correlation image processing, or the like. The geometric correction image processing generates an image subjected to necessary image processing including geometric correction to be suitable as a peripheral image of the primary display image. The interpolation image processing generates an image interpolated from the primary display image. The correlation image processing generates an image correlated with the primary display image. The front peripheral image generation unit 134 outputs the front peripheral image generated by performing necessary processing to the output image generation unit 133.

Then, the association processing unit 131 determines whether the projection image is projected onto planes (i.e., F-plane, C-plane, L-plane, and R-plane) other than the front (S-plane) (S233). In one example, in the case where the non-front image is specified in step S231, the association processing unit 131 can determine that the projection image is projected onto planes other than the front. If it is determined in step S233 that the projection image is projected onto planes other than the front, the non-front image generation unit 132 performs the image processing so that the non-front image displayed on these planes is optimum (S234).

The non-front image generation unit 132 performs, in one example, geometric correction image processing, interpolation image processing, correlation image processing, or the like. The geometric correction image processing generates an image subjected to necessary image processing including geometric correction to be suitable for projection onto the F-plane, the C-plane, the L-plane, and the R-plane. The interpolation image processing generates an image interpolated from the front image. The correlation image processing generates an image correlated with the front image. The non-front image generation unit 132 outputs the non-front image generated by performing necessary processing to the output image generation unit 133. Moreover, if it is determined in step S233 that the projection image is displayed only on the front (S-plane), the processing proceeds to step S235 without performing the processing of step S234.

Then, the output image generation unit 133 integrates the front peripheral image and the non-front image, and generates an output image to be projected from the projection device 10 (S235). In the combination of the front peripheral image and the non-front image, in one example, the two images may be combined without any modification, or the boundary area of the two images may be blurred or overlapped. The output image generated by the output image generation unit 133 is output to the projection device 10 for projecting it onto the projection space.

The configuration and function of the image display system according to the second embodiment of the present disclosure are described above. According to the present embodiment, even in the case where the primary display device is arranged in the projection space, the projection area of the projection image projected onto the periphery of the primary display device 20 is determined depending on the contents of the input image displayed on the primary display device 20. This makes it possible to provide the user with a high sense of presence or immersion.

3. Third Embodiment

Next, the schematic configuration of an image display system according to a third embodiment of the present disclosure is described with reference to FIGS. 12 to 14. The image display system according to the present embodiment analyzes the contents of an image projected onto a space by a projection device such as a projector and determines a projection area of the image in a projection space depending on the image contents, which is similar to the first embodiment. Furthermore, in the present embodiment, the position of the user in the projection space is detected and the projection area is controlled.

[3.1. Spatial Configuration]

Figure 12:
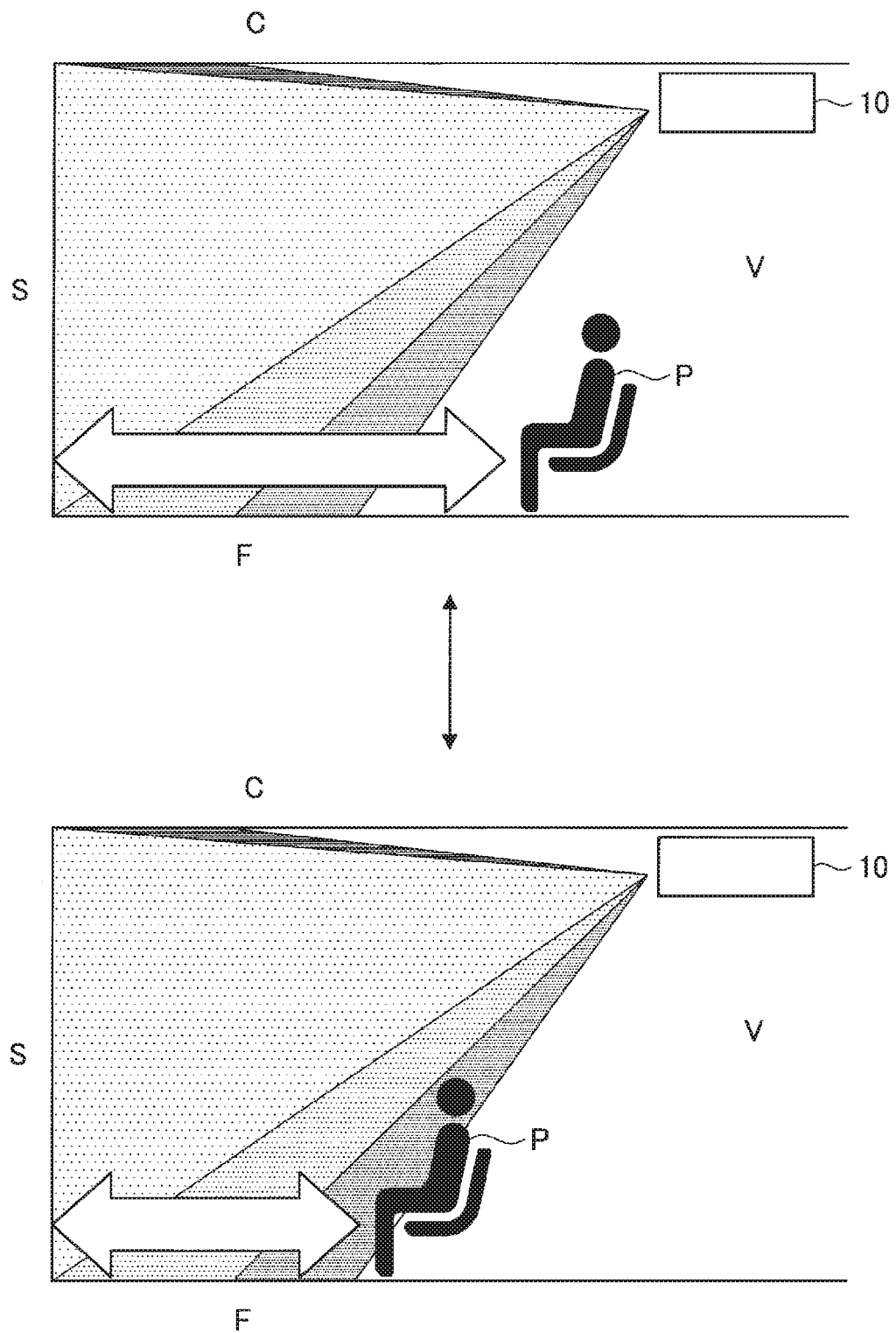
FIG. 12 is a diagram illustrated to describe the structure of a projection space onto which an image is projected by an image display system and the arrangement of a projection device, according to a third embodiment of the present disclosure.
Figure 13:
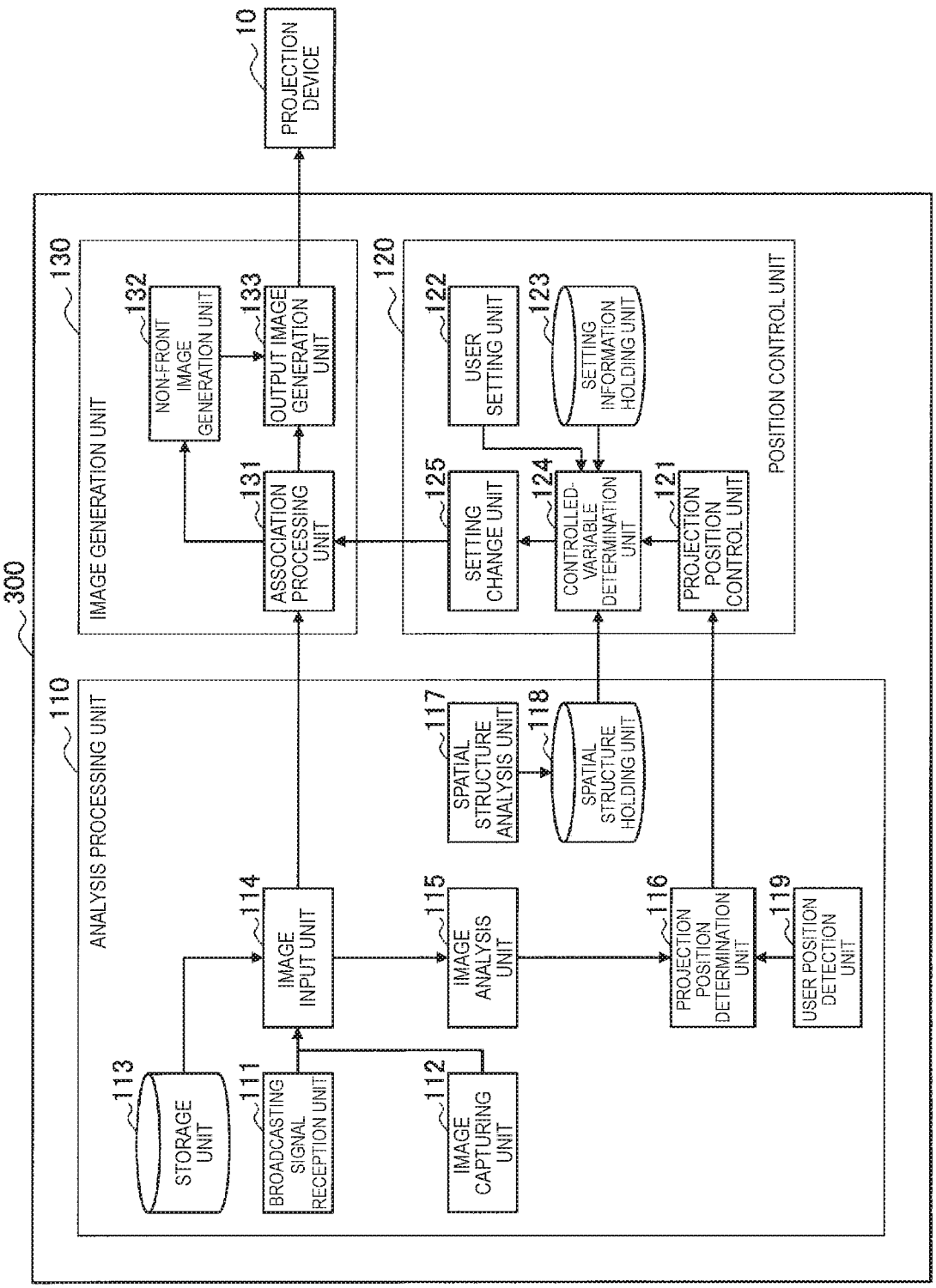
FIG. 13 is a functional block diagram illustrating a functional configuration of an information processing device according to the present embodiment.

FIG. 12 is a diagram illustrated to describe the structure of the projection space V on which the image is projected by the image display system and the arrangement of the projection device 10, according to the present embodiment. As illustrated in FIG. 12, the configuration of the projection space V is the same as that in FIGS. 1 and 2, except that the user exists on the side of the projection plane rather than the projection device 10. In the present embodiment, when the user exists in the projection space V, the projection area where the image is projected from the projection device 10 is restricted depending on the user position.

In the case where the user exists on the side of the projection plane rather than the projection device 10, in one example, as illustrated in the upper side of FIG. 12, the user may be near the projection device 10, and the distance to the front (S-plane) may be larger than or equal to a predetermined distance. At this event, the user does not block the light projected by the projection device 10. In this case, the image display processing that is similar to that of the first embodiment may be performed. On the other hand, if the distance between the user and the front (S-plane) is smaller than the predetermined distance, the user blocks the light projected by the projection device 10, which leads to occurrence of a shadow on the floor (F-plane). Thus, in the present embodiment, the detection of the position of the user in the projection space V and the control of the projection area allow the user to experience a sense of presence or immersion due to projection of the image on the floor (F-plane) while preventing occurrence of an unwanted shadow.

The difference from the image display system according to the first embodiment due to the existence of the user in the projection space V is mainly described below, and the detailed description of the components having the same configuration and function as those of the first embodiment description will be omitted.

[3.2. Functional Configuration of Information Processing Device]

The functional configuration of an information processing device 300 according to the present embodiment is now described with reference to FIG. 13. Moreover, FIG. 13 is a functional block diagram illustrating the functional configuration of the information processing device 300 according to the present embodiment. The information processing device 300 according to the present embodiment is configured to include the analysis processing unit 110, the position control unit 120, and the image generation unit 130, which is similar to the first embodiment. The information processing device 300 according to the present embodiment is different from the information processing device 100 according to the first embodiment is that the analysis processing unit 110 is provided with a user position detection unit 119.

The user position detection unit 119 detects the position of the user who exists in the projection space V. An example of the user position detection unit 119 to be used can include a depth sensor, a motion detector, remote controller position detection, or the like. A shadow occurrence region in which a shadow occurs due to existence of a user in the projection space V is set in advance, and the user position detection unit 119 detects whether a user exists in the shadow occurrence region. The detection result obtained by the user position detection unit 119 is output to the projection position determination unit 116. The projection position determination unit 116 determines the projection area on the basis of the analysis result obtained by the image analysis unit 115 and the detection result obtained by the user position detection unit 119.

The configurations of other functional units of the information processing device 300 are the same as those of the information processing device 100 according to the first embodiment illustrated in FIG. 4, the description thereof will be omitted herein.

[3.3. Image Display Processing]

The image display processing by the information processing device 300 according to the present embodiment is now described. The image display processing according to the present embodiment includes analysis processing, position control processing of the projection device 10, and image generation processing, which is similar to the first embodiment. The image display processing according to the present embodiment is different from the first embodiment in that the projection area of the image is changed depending on the position of the user in the projection space V in the analysis processing. Moreover, the position control processing and the image generation processing of the projection device 10 are similar to the processing illustrated in FIGS. 6 and 7, and so the analysis processing according to the present embodiment is described below with reference to FIG. 14. FIG. 14 is a flowchart illustrating the analysis processing by the information processing device 300 according to the present embodiment.

(1) Analysis Processing

Figure 14:
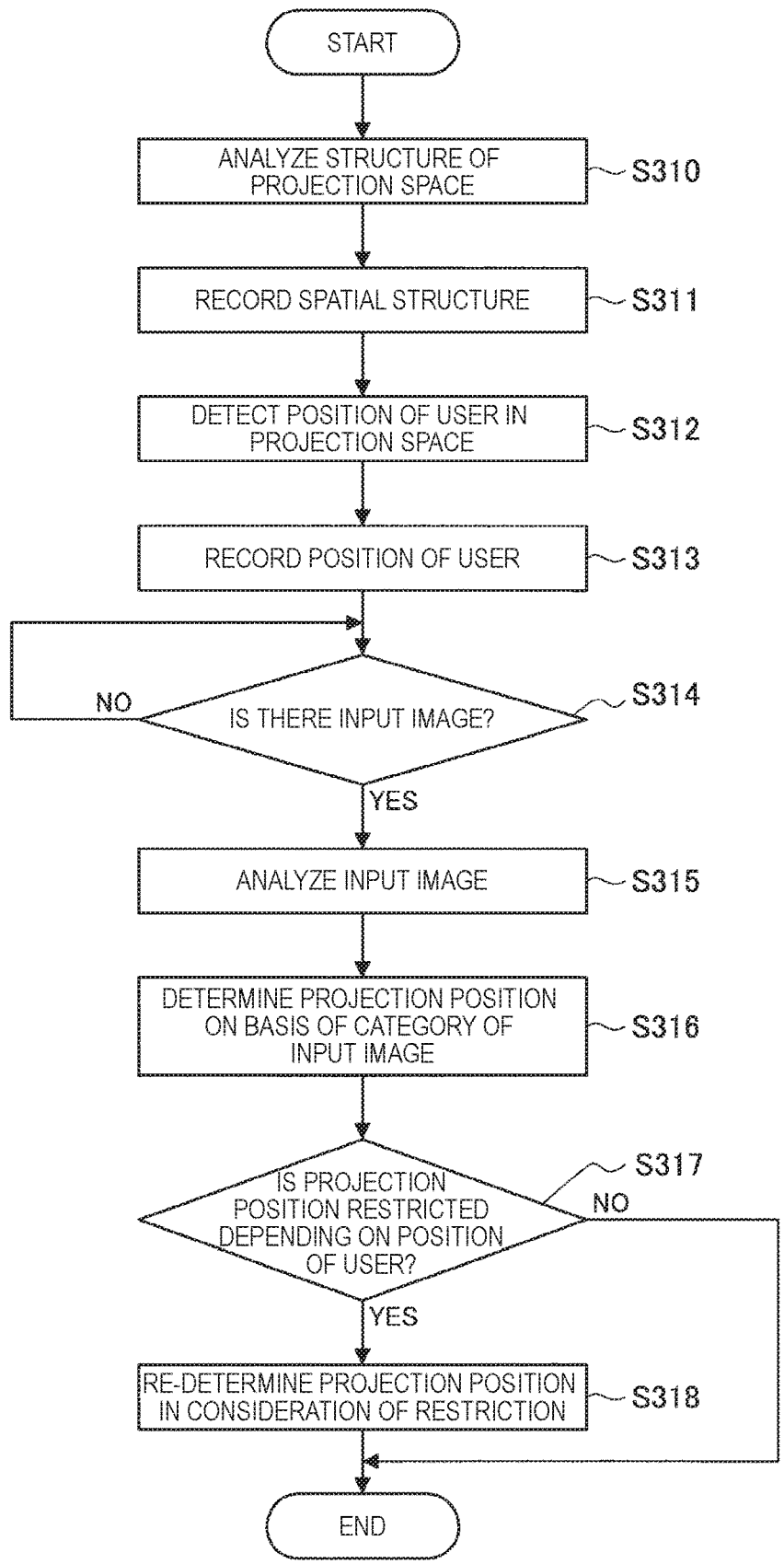
FIG. 14 is a flowchart illustrating analysis processing by the information processing device according to the present embodiment.

In the analysis processing of the image and space according to the present embodiment, first, as illustrated in FIG. 14, the spatial structure analysis unit 117 analyzes the structure of the projection space where the image is projected by the projection device 10 (S310). The spatial structure of the projection space analyzed in step S310 is recorded in the spatial structure holding unit 118 (S311). The processing in steps S310 and S311 is performed in the similar way to steps S110 and S111, respectively, in FIG. 5.

Subsequently, the user position detection unit 119 detects a user in the projection space V and measures the user's position (S312). As described above, the position of the user can be detected using, in one example, a depth sensor, a motion detector, remote controller position detection, or the like. When the detection of the user position in the projection space V is completed, the user position is recorded in a storage unit (not illustrated) (S313).

Further, it is determined whether an image is input to the image input unit 114 (S314). The processing of step S314 is repeatedly executed until the primary image signal is input to the image input unit 114. When the primary image signal is input to the image input unit 114, the image analysis unit 115 analyzes the input image (S315). In the analysis of the input image in step 315, it is determined what kind of category the contents of the input image belong to, which is similar to the first embodiment. The processing of steps S314 and S315 is performed in the similar way to that of steps S112 and S113, respectively, in FIG. 5.

Then, the projection position determination unit 116 determines a projection area in the projection space where the input image is projected on the basis of the analysis result obtained in step S315 (S316). First, the projection position determination unit 116 determines whether the analysis result corresponds to a preset category. If there is a corresponding category, it is determined to display the input image on the projection area that is optimum for the corresponding preset category. On the other hand, if there is no category corresponding to the preset category, the projection position determination unit 116 may set the projection area of the input image to, in one example, the same as a specific category, or a preset default projection area. The processing of step S316 is also performed in the similar way to that of step S114 in FIG. 5.

In addition, the projection position determination unit 116 determines whether the projection area of the input image is restricted on the basis of the user position recorded in step S313 (S317). In the case where the user position is within the shadow occurrence region, the projection position determination part 116 re-calculates a projection area in consideration of the restriction of the projection position depending on the user position and determines an optimum projection area (S318). In one example, the projection area of the floor (F-plane) included in the projection area may be narrowed toward the front (S-plane) side, or the projection area of the floor (F-plane) may be eliminated. The projection position determination unit 116 outputs the projection area set again in this manner to the position control unit 120 as the projection position of the input image.

On the other hand, if it is determined in step S317 that the user position is outside the shadow occurrence region and there is no restriction on the projection position, the projection area determined in step 316 is output to the position control unit 120 as the projection position of the input image.

The configuration and function of the image display system according to the third embodiment of the present disclosure are described above. According to the present embodiment, in the case where a user exists in the projection space, if the image projected by the user is blocked, the projection area where the input image is projected is reset so that the image is not blocked. This makes it possible to provide the user with a high sense of presence or immersion.

4. Fourth Embodiment

Figure 16:
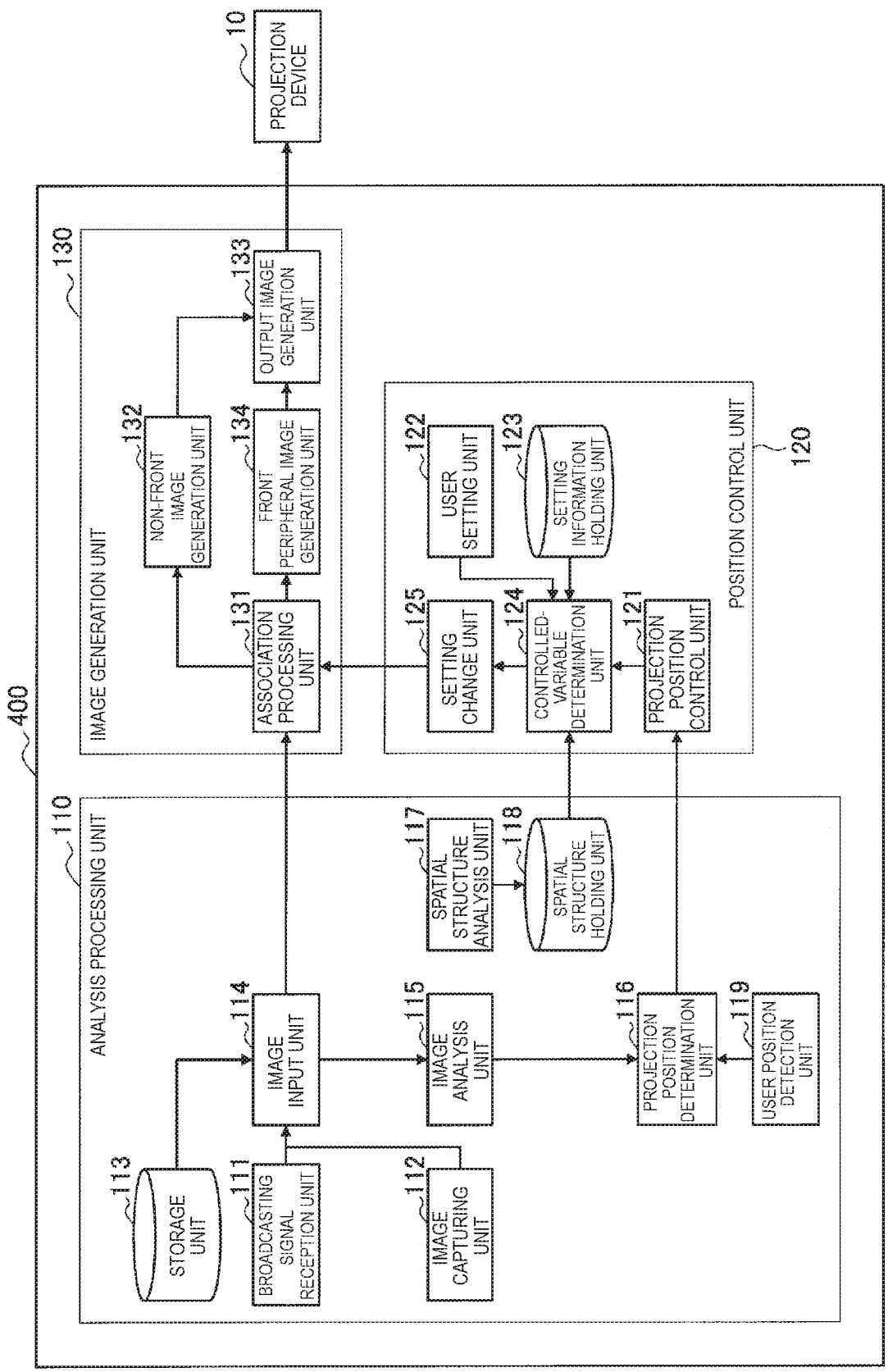
FIG. 16 is a functional block diagram illustrating a functional configuration of an information processing device according to the present embodiment.

Next, the schematic configuration of an image display system according to the fourth embodiment of the present disclosure is described with reference to FIGS. 15 and 16. The image display system according to the present embodiment analyzes the contents of an image projected onto a space by a projection device such as a projector and determines a projection area of the image in a projection space depending on the contents of the image, which is similar to the first embodiment. However, in the present embodiment, the primary display device 20 is arranged in the projection space, which is similar to the second embodiment. Furthermore, in the present embodiment, the position of the user in the projection space is detected and the projection area is controlled, which is similar to the third embodiment. In other words, in the projection space V of the present embodiment, as illustrated in FIG. 15, the primary display device 20 is arranged in front of the front (S-plane) and a user P exists.

The present embodiment is an example obtained by combining the techniques of the second and third embodiments. As illustrated in the functional block diagram of FIG. 16, in an information processing device 400 according to the present embodiment, the analysis processing unit 110 is configured to further include the user position detection unit 119, and the image generation unit 130 is configured to further include the front peripheral image generation unit 134, as compared with the information processing device 100 of the first embodiment illustrated in FIG. 4. This makes it possible to restrict the projection area where the image is projected from the projection device 10 depending on the user position when the user exists in the projection space V, and so the user does not block the image projected by the projection device 10. In addition, the arrangement of the primary display device 20 in the projection space allows the projection area of the projection image projected on the periphery of the primary display device 20 to be determined depending on the contents of the input image displayed on the primary display device 20. This makes it possible to provide the user with a high sense of presence or immersion.

5. Emotional Video Generation

In the image display system according to the present embodiment described above, the image displayed in the projection space may be an input image that is input to the image input unit 114 or may be an image that is different from the input image. Here, in order to enhance the user's sense of presence or immersion, in the related art, an emotional video matching the input image is created and is displayed together with the input image. However, the feeling of the creator greatly affects the emotional video created in the related art, and the created emotional video is also displayed while being retrofitted to the input image.

In the image display system according to the above embodiment, it is desirable to create automatically an emotional video to be displayed together with the input image in real time. Thus, the image display system according to the above embodiment provided with an emotional video processing unit 140 as described below makes it possible to generate automatically an emotional video having a high affinity with the input image and to enhance display the user's sense of presence or immersion. The configuration and function of the emotional video processing unit 140 will be described below in detail with reference to FIGS. 17 to 28. Moreover, the following description is given on the assumption that the input image is displayed on the primary display device 20 and the projection device 10 displays the emotional video created by the emotional video processing unit 140 in the image display system according to the second embodiment described above.

[5.1. Functional Configuration]

Figure 17:
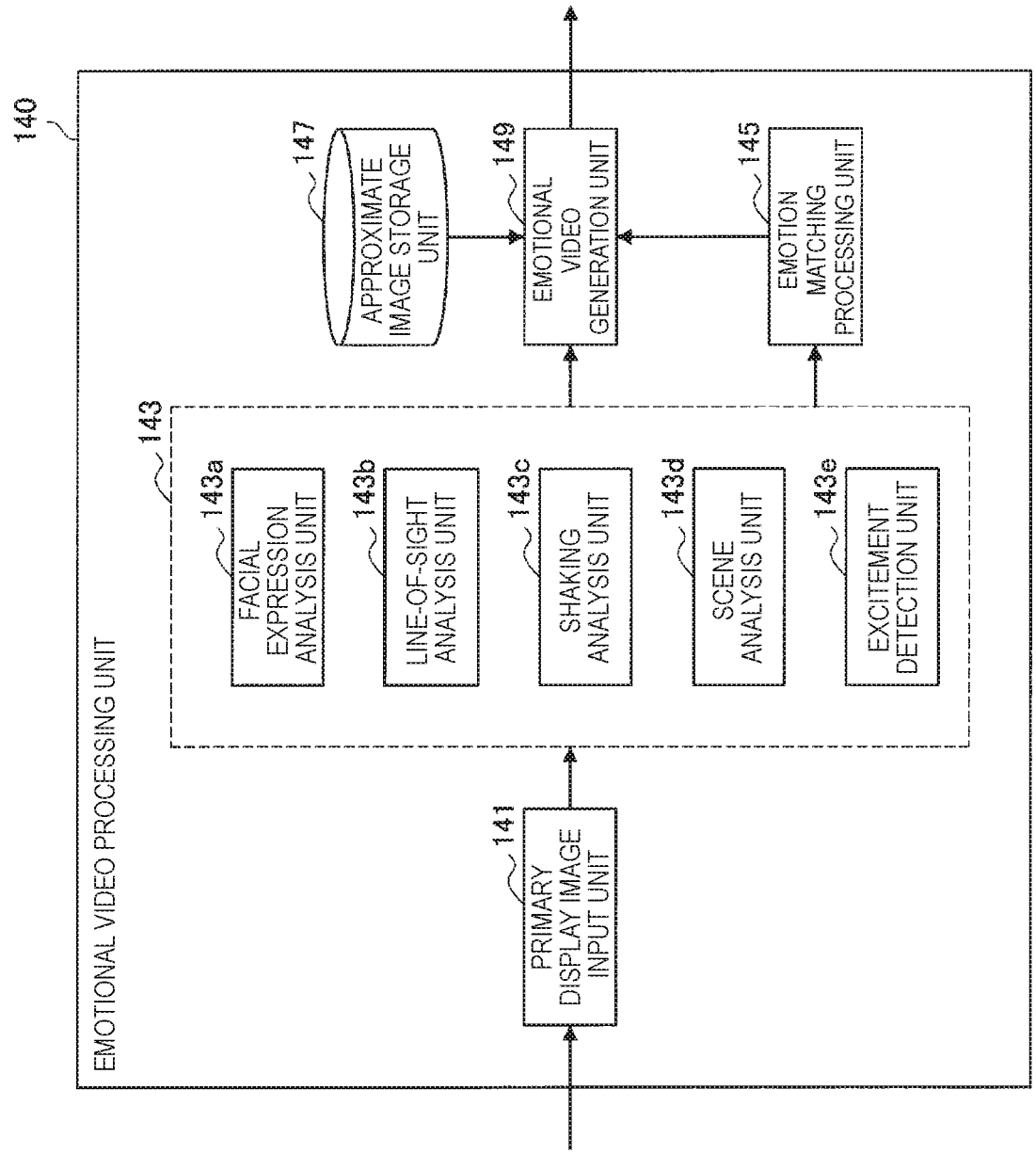
FIG. 17 is a functional block diagram illustrating a functional configuration of an emotional video processing unit of the image display system according to the present embodiment.

The functional configuration of the emotional video processing unit 140 is now described with reference to FIG. 17. Moreover, FIG. 17 is a functional block diagram illustrating the functional configuration of the emotional video processing unit 140. As illustrated in FIG. 17, the emotional video processing unit 140 according to the present embodiment is configured to include a primary display image input unit 141, a content analysis unit 143, an emotion matching processing unit 145, an approximate image storage unit 147, and an emotional video generation unit 149.

The primary display image input unit 141 is a functional unit to which an input image displayed on the primary display device 20 is input. The input image is, in one example, video content such as movie, drama, and sports, and is displayed on the primary display device 20. The primary display image input unit 141 outputs the input image to the content analysis unit 143.

The content analysis unit 143 analyzes the input image in real time and acquires a feature amount included in the content. The content analysis unit 143 is configured to include, in one example, a facial expression analysis unit 143a that analyzes the face and facial expression of the user who views an input image (content), a line-of-sight analysis unit 143b that analyzes a user's line of sight, a shaking analysis unit 143c, or the like. In addition, the content analysis unit 143 is configured to include a scene analysis unit 143d that analyzes a scene by the scene analysis technique using a feature amount or a pattern of the content, an excitement detection unit 143e that detects excitement on the basis of the strength or the change of the sound included in the content, or the like. The analysis result obtained by the content analysis unit 143 is output to the emotion matching processing unit 145 and the emotional video generation unit 149.

The emotion matching processing unit 145 analyzes the motion of an object displayed on the basis of the feature amount of the content and generates synchronization information used to synchronize the motion of the generated emotional video. The motion analysis processing by the emotion matching processing unit 145 will be described later in detail. The synchronization information generated by the emotion matching processing unit 145 is output to the emotional video generation unit 149.

The approximate image storage unit 147 is a storage unit that stores an image to be an original image of the emotional video. Although the approximate image storage unit 147 is provided in the emotional video processing unit 140 in FIG. 17, the present disclosure is not limited to this example, and in one example, an image file server or the like connected communicably via a network may be used.

The emotional video generation unit 149 acquires the original image of the emotional video from the approximate image storage unit 147 on the basis of the analysis result obtained by the content analysis unit 143 and the processing result obtained by the emotion matching processing unit 145, and generates an information video. The processing of generating the emotional video will be described later. The emotional video generated by the emotional video generation unit 149 is input as a projection image to the association processing unit 131 of the image generation unit 130 illustrated in FIG. 10, in one example.

[5.2. Emotional Video Generation Processing]

Figure 18:
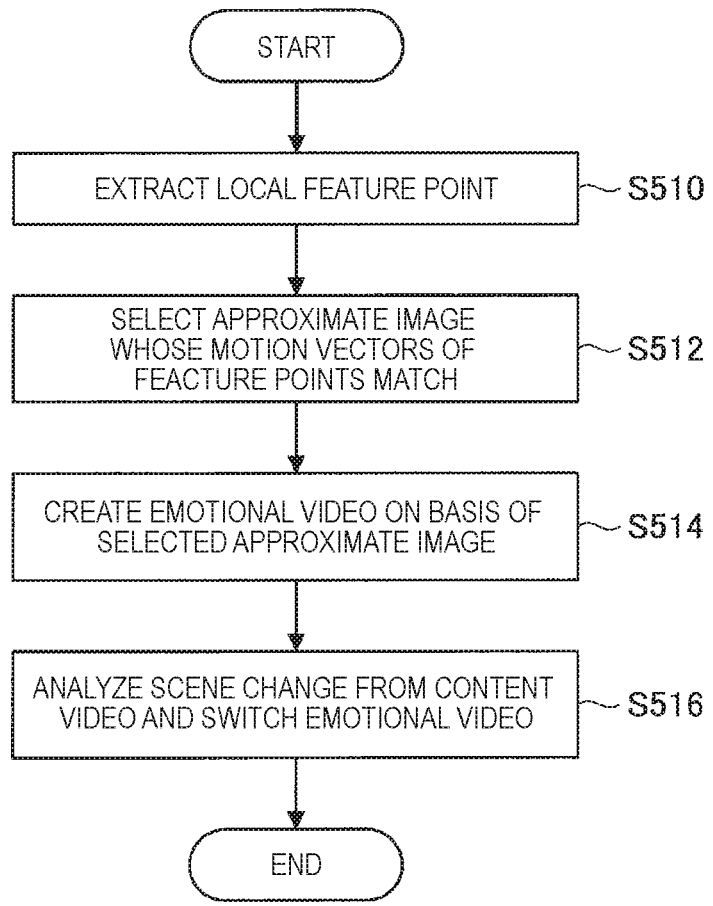
FIG. 18 is a flowchart illustrating processing of selecting an original image of an emotional video.
Figure 19:
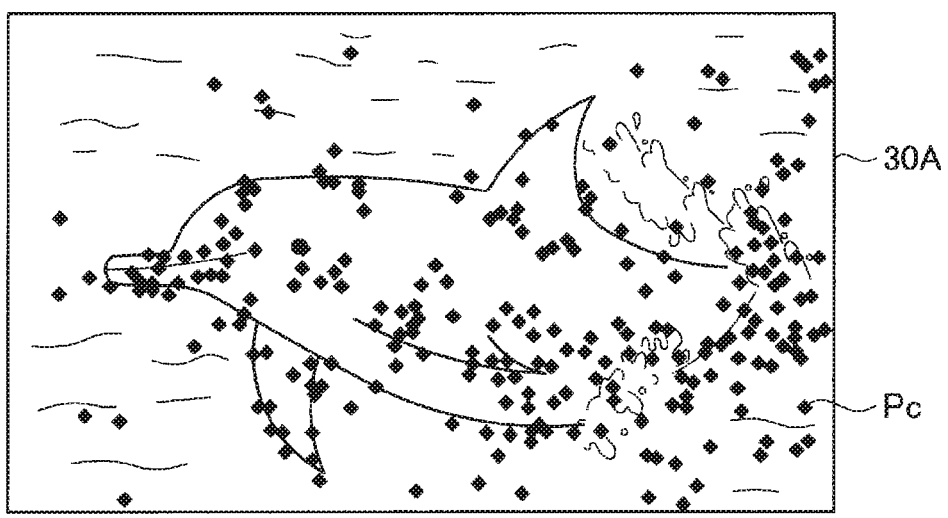
FIG. 19 is a diagram illustrated to describe an example of a state in which a local feature point is extracted from an input image.
Figure 20:
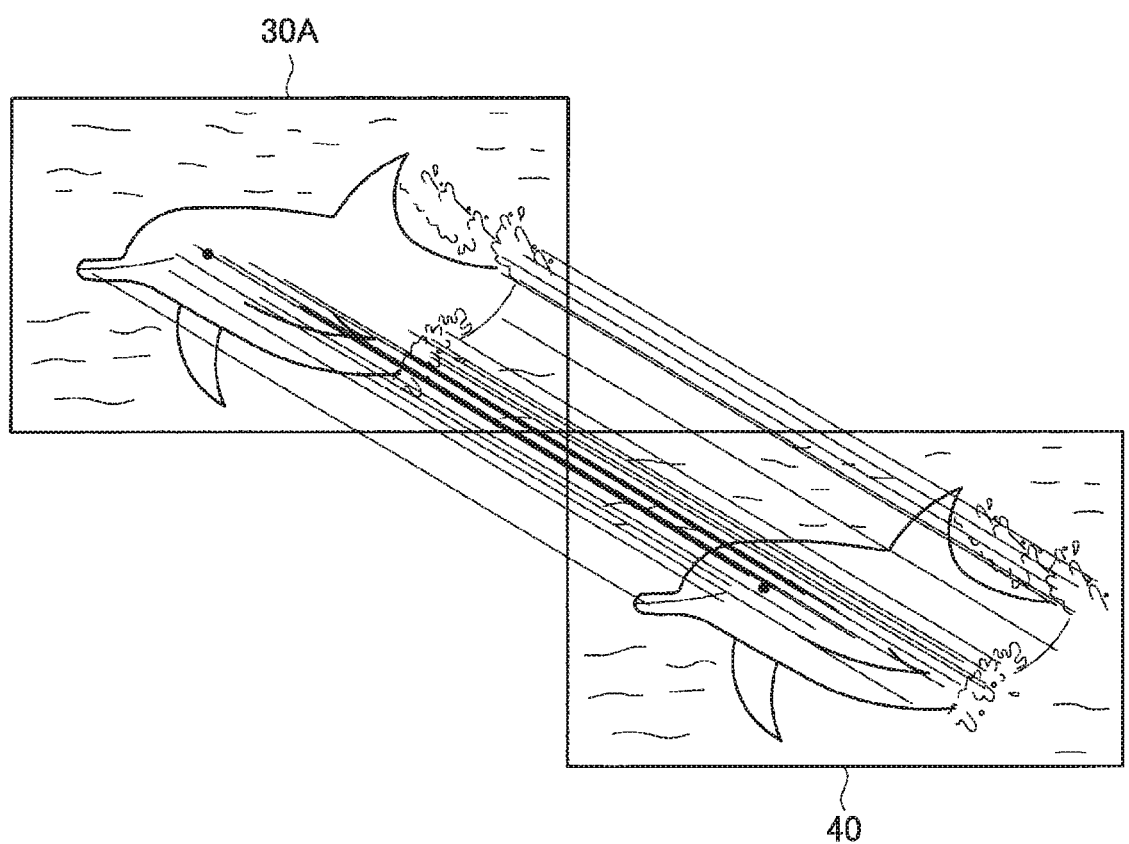
FIG. 20 is a diagram illustrated to describe an example of a state in which motion vectors of feature points match with each other.
Figure 21:
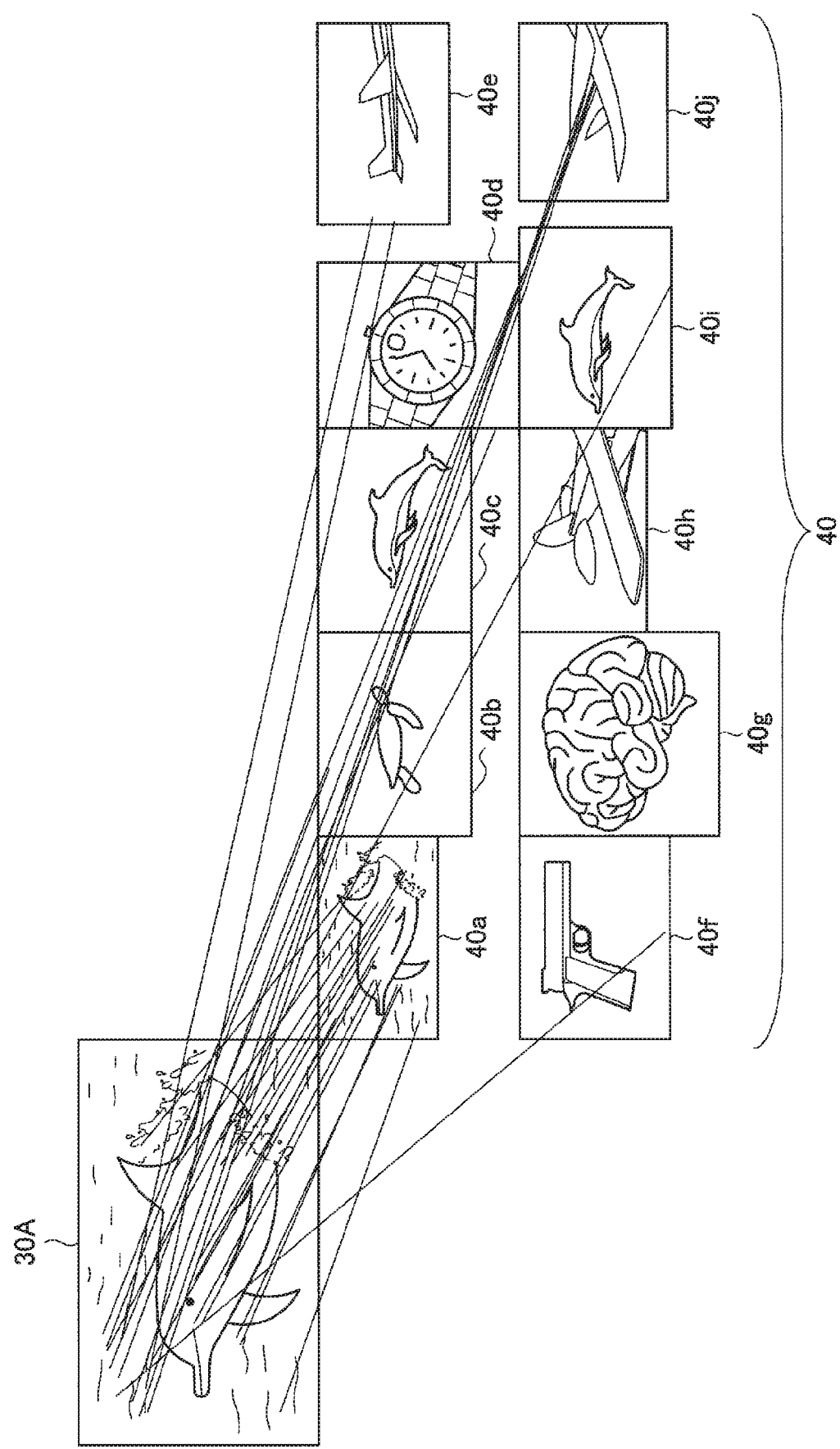
FIG. 21 is a diagram illustrated to describe processing of selecting an approximate image of an input image from an approximate image storage unit.
Figure 22:
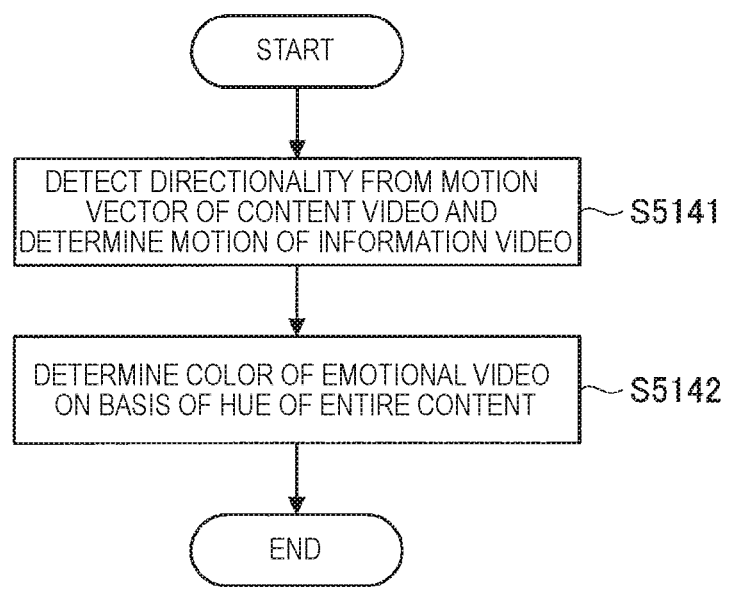
FIG. 22 is a flowchart illustrating emotional video generation processing by the emotional video processing unit.
Figure 23:
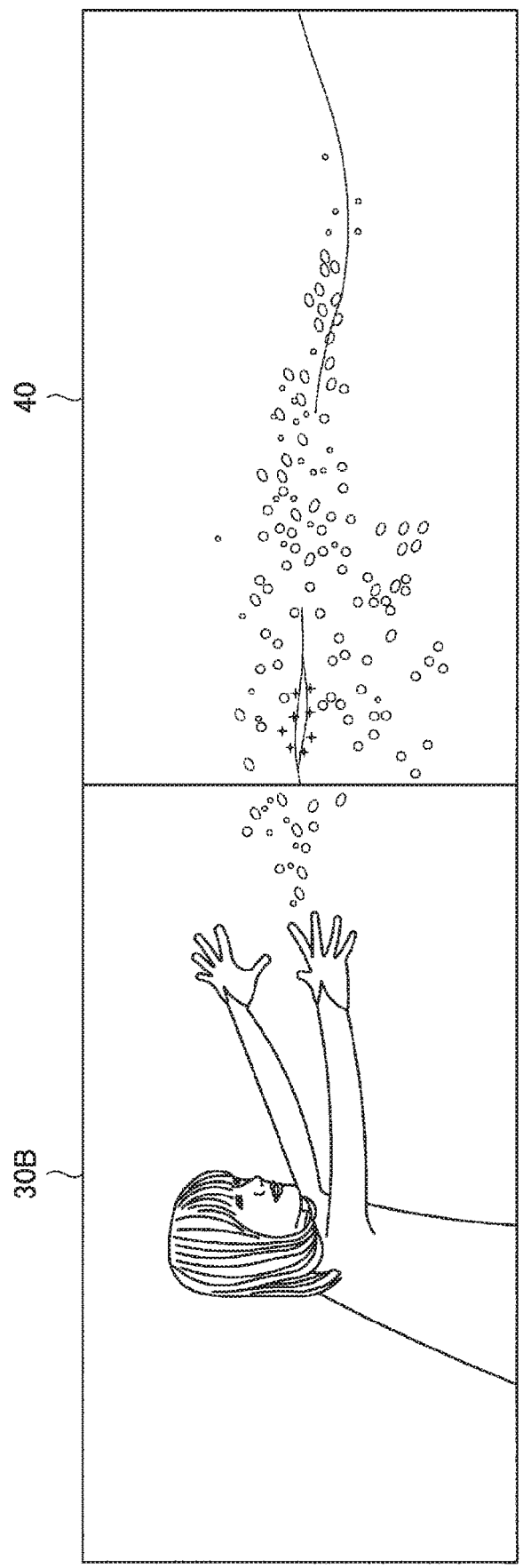
FIG. 23 is a diagram illustrated to describe an example in which a motion direction of an emotional video is determined on the basis of content synchronization information.
Figure 24:
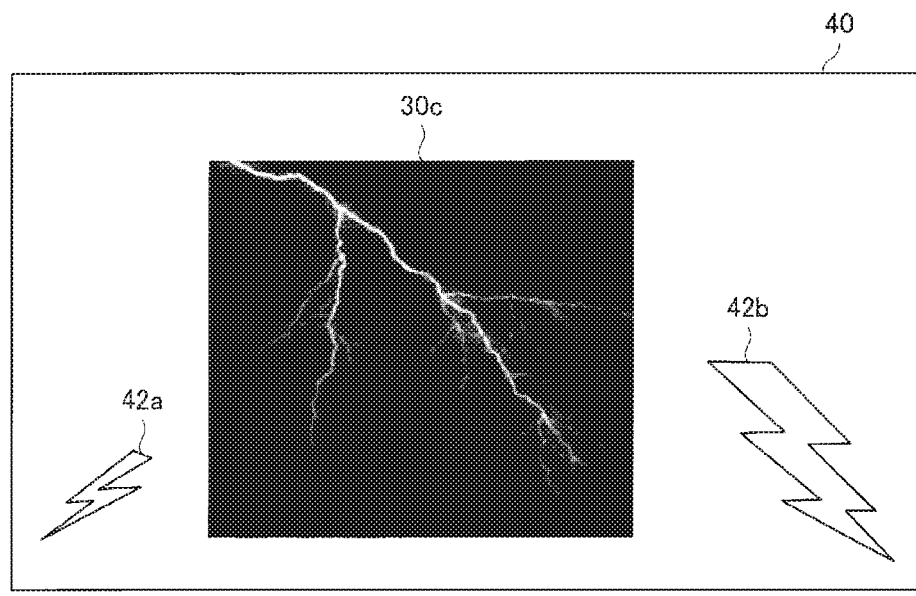
FIG. 24 is a diagram illustrated to describe another example in which the motion direction of an emotional video is determined on the basis of content synchronization information.
Figure 25:
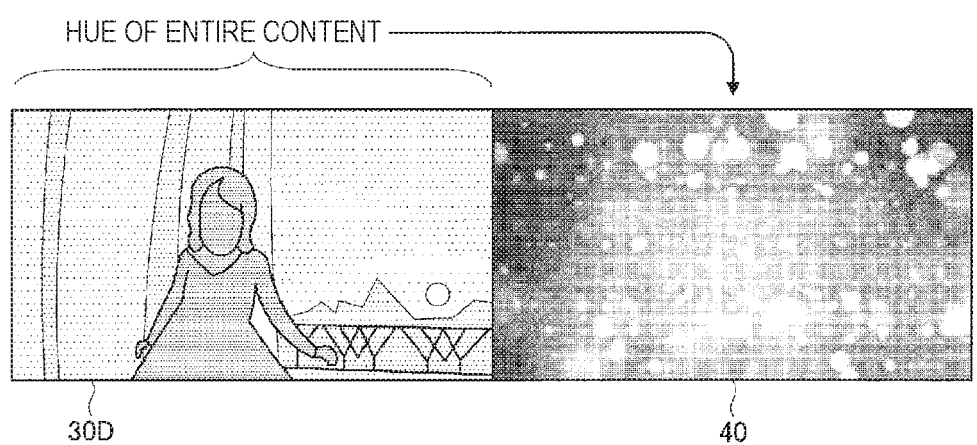
FIG. 25 is a diagram illustrated to describe an example in which the color of an emotional video is determined on the basis of the hue of content.
Figure 26:
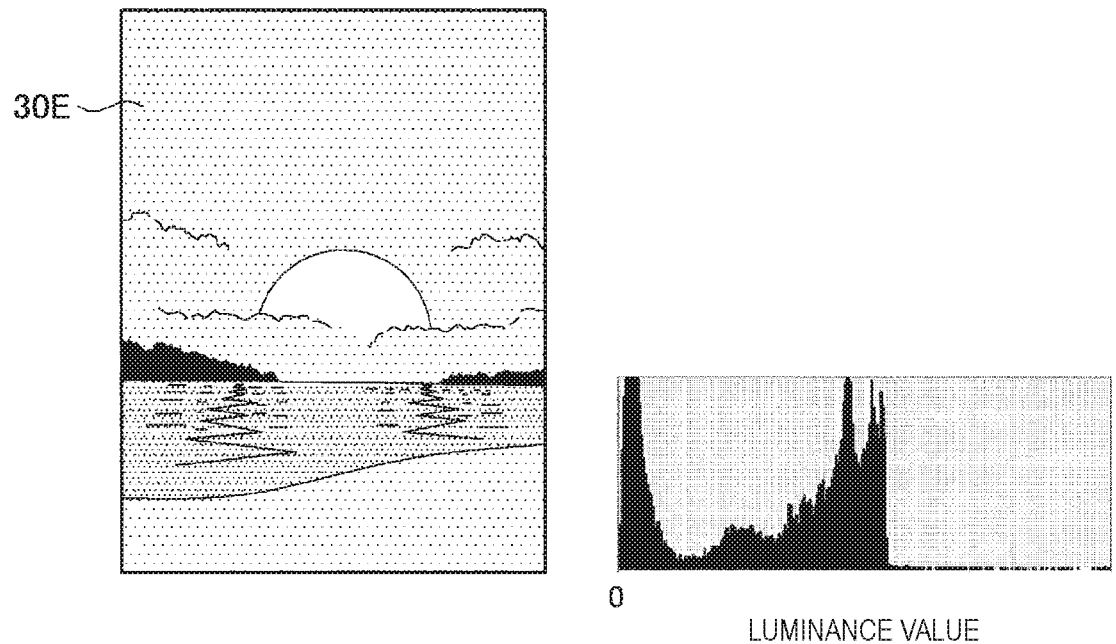
FIG. 26 is a diagram illustrated to describe an example of a histogram of luminance in a sunset scene.
Figure 27:
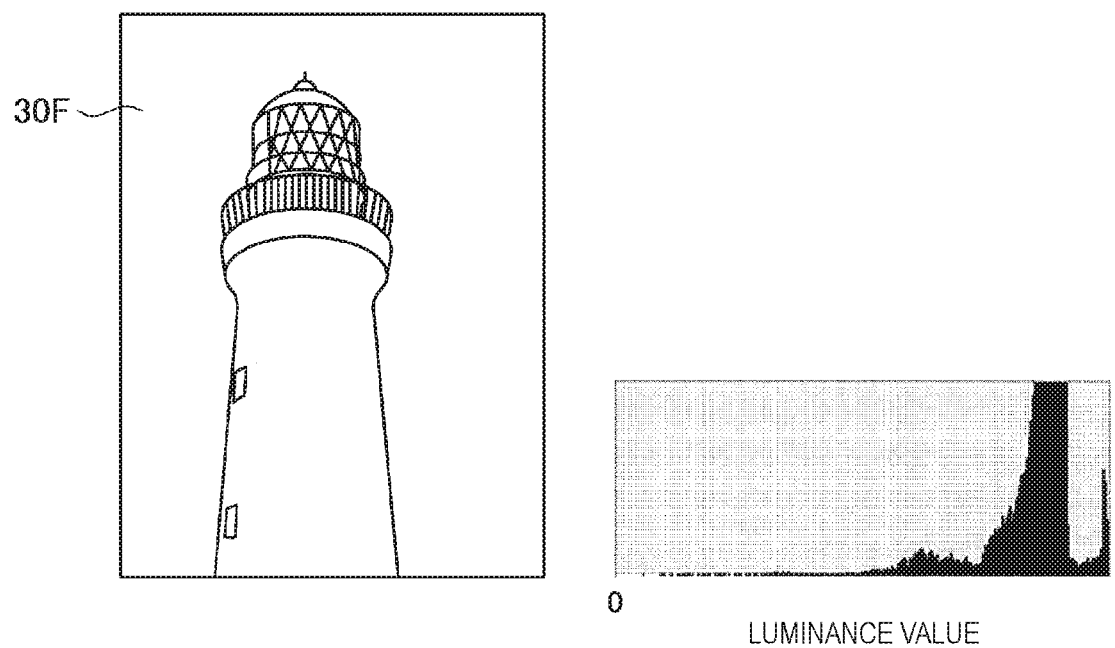
FIG. 27 is a diagram illustrated to describe an example of a histogram of luminance in a daytime scene.

Next, the emotional video generation processing by the emotional video processing unit 140 will be described with reference to FIGS. 18 to 28. Moreover, FIG. 18 is a flowchart illustrating the processing of selecting the original image of the emotional video. FIG. 19 is a diagram illustrated to describe an example of a state in which a local feature point is extracted from an input image. FIG. 20 is a diagram illustrated to describe an example of a state in which motion vectors of feature points match with each other. FIG. 21 is a diagram illustrated to describe a processing of selecting an approximate image of the input image from the approximate image storage unit 147. FIG. 22 is a flowchart illustrating the emotional video generation processing by the emotional video processing unit 140. FIG. 23 is a diagram illustrated to describe an example in which the motion direction of the emotional video is determined on the basis of content synchronization information. FIG. 24 is a diagram illustrated to describe another example in which the motion direction of the emotional video is determined on the basis of the content synchronization information. FIG. 25 is a diagram illustrated to describe an example in which the color of the emotional video is determined on the basis of the hue of the content. FIG. 26 is a diagram illustrated to describe an example of a histogram of luminance in a sunset scene. FIG. 27 is a diagram illustrated to describe an example of a histogram of luminance in a daytime scene.

Figure 28:
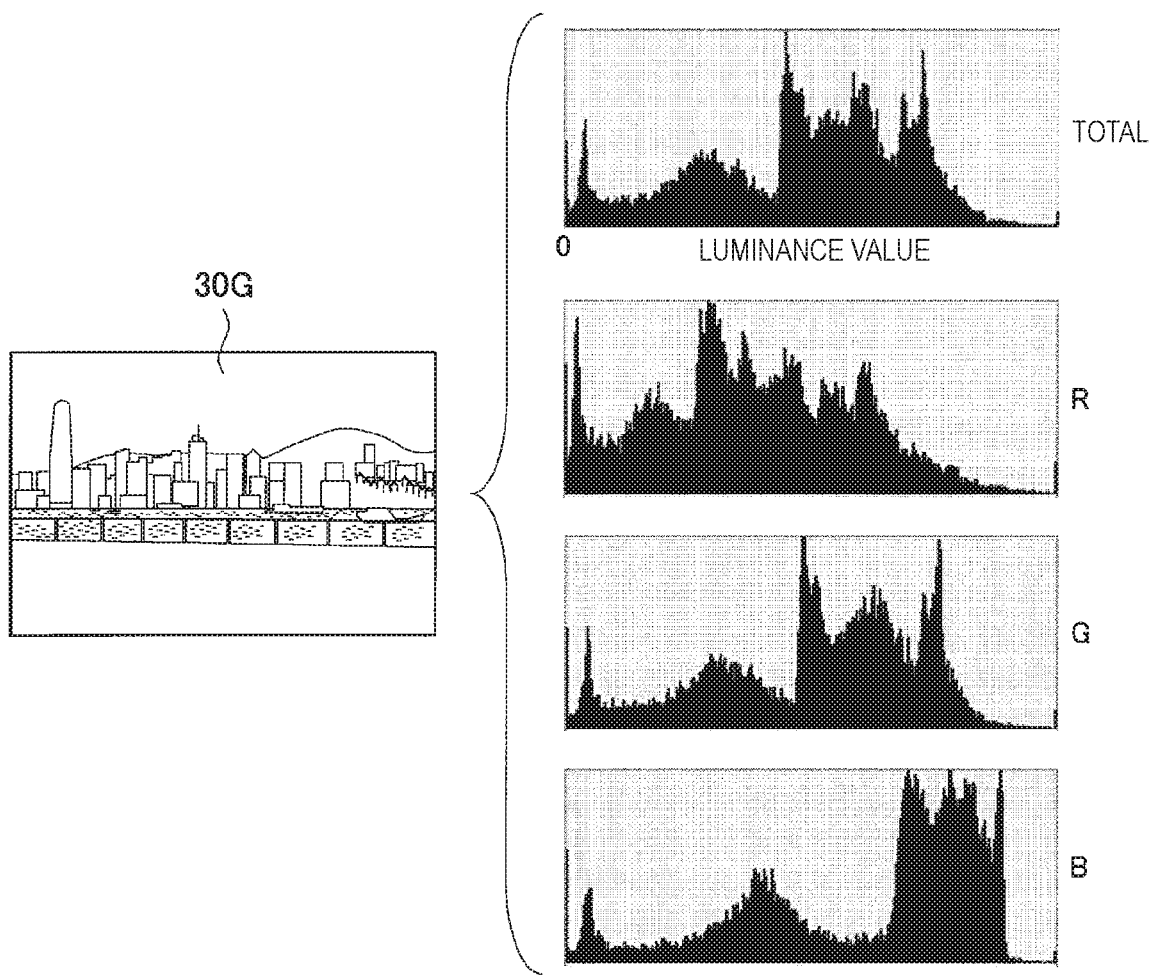
FIG. 28 is a diagram illustrated to describe an example of a histogram of luminance for each RGB.

FIG. 28 is a diagram illustrated to describe an example of a histogram of luminance for each RGB.

Here, in one example, a method of generating an emotional video by performing scene analysis using the feature amount of the content by the scene analysis unit 143d of the content analysis unit 143 is described. In such processing, first, it is necessary to recognize (analyze) identity of an object displayed in the content. An object to be a target of the motion is typically specified from the content and motion information is acquired. Thus, as illustrated in FIG. 18, the scene analysis unit 143d first extracts a feature point included in the image from the content image (S510).

As a technique of extracting a feature point Pc in the image, in one example, as illustrated in FIG. 19, there is known a technique of extracting a local feature amount called scale-invariant feature transform (SIFT) from an image 30A. The SIFT is an algorithm for detecting a feature point and describing a feature amount. Such a technique describes a feature amount that is robust to the detected feature point, such as rotation of the image, scale change, and illumination change, and so it is image processing technology widely used for image matching such as image mosaic, object recognition, and object detection.

Subsequently, when the feature point Pc in the image is extracted, the emotional video generation unit 149 performs matching processing for specifying the object and selects an approximate image that is approximate to the input image (S512). The approximate image is selected from the images stored in the approximate image storage unit 147. The emotional video generation unit 149 selects an image that is approximate in feature point to the image from which the feature point is extracted in step S510. In one example, as illustrated in FIG. 20, an associated place is obtained between two images by matching feature points. In this case, the straight line connecting the feature points in the two images shows that the feature vectors of the feature points at both ends are similar (i.e., the distance is small).

As described above, an image in which the feature vector of the feature point is approximate is selected from the group of images stored in the approximate image storage unit 147. In one example, as illustrated in FIG. 21, among images 40a to 40j that are included in an image group 40 stored in the approximate image storage unit 147, the image 40a on which feature points approximate to the feature vector are concentrated is selected as an original image of the emotional video. Moreover, even if there are some mistakes in matching of feature points, they are allowed here.

Then, the emotional video generation unit 149 creates an emotional video by setting the selected approximate image as the original image of the emotional video (S514). Here, the emotional video generation processing is described with reference to FIGS. 22 to 25.

As illustrated in FIG. 22, the emotional video generation unit 149 first detects the directionality from the motion vector of the content that is the input image, and determines the motion direction of the emotional video (S5141). The processing of step S5141 makes it possible to display an object video flowing in the motion direction of the hand as the emotional video 40 in accordance with the motion of the hand of the person in an input image 30B, in one example, as illustrated in FIG. 23. In addition, as illustrated in FIG. 24, when there is a thunder scene in an input image 30c, it is also possible to generate the emotional video 40 in which objects 42a and 42b representing the intensity of thunder in accordance with the motion direction of the lightning are displayed.

The processing is described in detail with reference to FIG. 24. First, a motion vector of thunder is detected from an input image. An example of the motion vector detection technique includes a motion compensated inter-frame prediction technique (e.g., JP S62-002515B, JP H1-033994B, JP H6-014739B, JP 562-291280A, and JP H8-013140B).

Subsequently, the emotional video generation unit 149 determines the color of the emotional video on the basis of the hue of the entire content (S5142). The color information of the content can be acquired through a signal or a colorimetric sensor. In one example, as illustrated in FIG. 25, the chromaticity is measured for the entire input image 30D that is displayed on the left side and the hue of the entire contents is specified by calculating the average chromaticity. Then, the emotional video generation unit 149 generates an emotional video 40 of the color close to the hue of the specified content as a whole. In one example, in a sunset scene, an emotional video having colors ranging in hue from orange to pink is generated.

The emotional video generation unit 149 inputs the generated emotional video 40 as described above by setting it as the projection image to the association processing unit 131 of the image generation unit 130. The emotional video is projected onto the projection space V by the projection device 10 after the image generation unit 130 performs the predetermined image processing.

Referring back to the description of FIG. 18, the emotional video generation unit 149 analyzes the scene change from the content (S516). In the present embodiment, the scene change is analyzed on the basis of the histogram generated using the luminance information of the entire image. The histogram (i.e., frequency distribution graph) is a diagram representing the distribution of luminance (degree of contrast) of the image. Typically, the horizontal axis represents luminance, the vertical axis represents the number of pixels (frequency), the left side represents dark (black) pixels, and the right side represents bright (white) pixels.

In one example, FIGS. 26 and 27 illustrate a histogram of the luminance of an image 30E representing the sunset scene and a histogram of the luminance of an image 30F representing the daytime scene, respectively. In the sunset scene of FIG. 26, the distribution of luminance in the histogram is biased to the left side, whereas in the daytime scene of FIG. 27, the distribution of luminance in the histogram is biased to the right side. In this way, the histogram of the sunset and the histogram of the lighthouse are distinctly different in shape. Thus, the emotional video generation unit 149 determines that the scene change occurs.

Further, in FIGS. 26 and 27, the scene change is determined on the basis of the histogram of the luminance, but in addition to the luminance histogram, it is also possible to determine the scene change by the histogram of each color. In one example, FIG. 28 illustrates a histogram of the luminance of a certain scenery input image 30G and a histogram of each color. As illustrated in FIG. 28, the histogram of the luminance represents the degree of lightness and darkness obtained by combining all the colors. Typically, the luminance information is determined by the appearance frequency of G, and so the entire histogram and the histogram of G are similar. In this way, in addition to the histogram of the luminance, the determination of the scene change using the histogram of each color makes it possible to achieve detection with high accuracy.

If it is determined that the scene change occurs in step S516, the emotional video generation unit 149 executes the processing illustrated in FIG. 18 on a new scene image. This makes it possible to generate an emotional video corresponding to a new scene every time the scene change is detected.

6. Summary

The image display systems according to the present embodiments of the present disclosure are described above. According to these image display systems, the projection position of the projection device is changed depending on the contents of an image, and so it is possible to provide the user with a high sense of presence or immersion. In addition, in the case where the primary display device and the projection device are arranged in the same projection space, peripheral images appropriately generated depending on the contents of the image displayed on the primary display device are superimposed and projected by the projection device. In this case, also, the projection position of the projection device is changed depending on the contents of the image displayed on the primary display device, and so it is possible to provide the user with a high sense of presence or immersion. Furthermore, the projection position is changed depending on the position of the user, and so it is possible to provide the user with a high sense of presence or immersion while preventing reflected glare of the user's own shadow. The projection position by the projection device can also be set depending on the user's own preference and so it is possible to construct a video environment preferred by the user.

Further, it is possible to provide the viewer with a high sense of immersion by displaying an emotional video that induces the emotion of the viewer in the peripheral visual field corresponding to the input image. According to the image display system of the present disclosure, an object is recognized from a feature point of content that is an input image to acquire an approximate image, which is set as the original image of the emotional video. In generating an emotional video, a motion is set such that it exists on an extension line of a direction estimated from a motion vector of a feature point included in the content, and a color close to the hue of the content is set. Furthermore, it is possible to switch to a new emotional video by determining the scene change from the change of the histogram generated on the basis of the luminance information of the content. Thus, it is possible to generate an emotional video having high affinity with the content in real time.

7. Hardware Configuration

Figure 29:
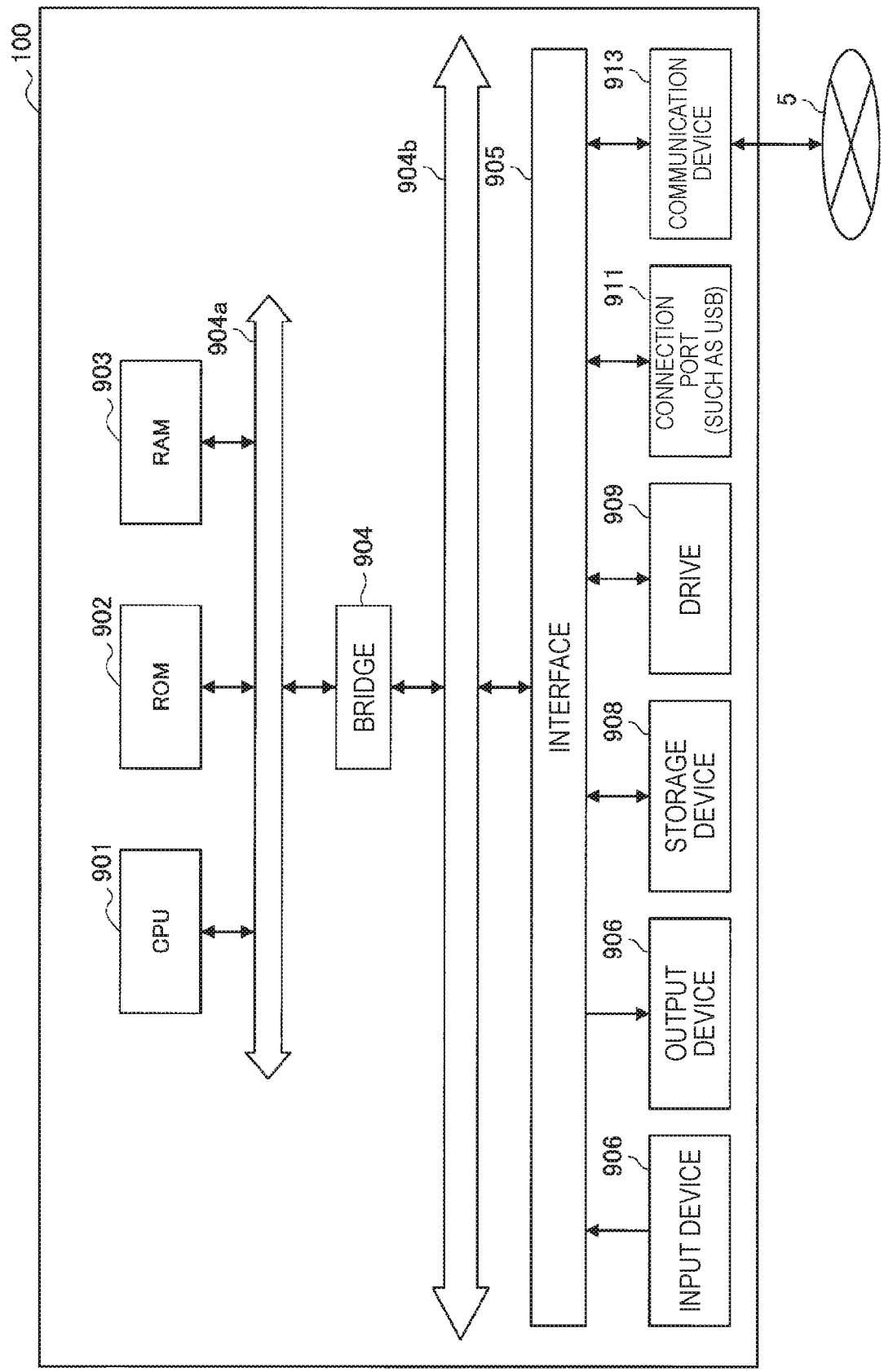
FIG. 29 is a hardware configuration diagram illustrating a hardware configuration of the information processing device according to an embodiment of the present disclosure.

Finally, the hardware configuration example of the information processing device 100 according to the embodiment described above is described. FIG. 29 is a hardware configuration diagram illustrating the hardware configuration of the information processing device 100 according to the embodiment described above. Moreover, the information processing devices 200 to 400 according to the second to fourth embodiments can also be configured in a similar manner to the hardware configuration of the information processing device 100 illustrated in FIG. 29.

The information processing device 100 according to the present embodiment can be implemented as a processing device including a computer, as described above. As illustrated in FIG. 29, the information processing device 100 is configured to include a central processing unit (CPU) 901, a read only memory (ROM) 902, a random access memory (RAM) 903, and a host bus 904a. In addition, the information processing device 100 is configured to include a bridge 904, an external bus 904b, an interface 905, an input device 906, an output device 907, a storage device 908, a drive 909, a connection port 911, and a communication device 913.

The CPU 901 functions as an arithmetic processing unit and a control unit and controls the overall operation in the information processing device 100 in accordance with various programs. In addition, the CPU 901 may be a microprocessor. The ROM 902 stores, in one example, a programs or an operation parameter that is used by the CPU 901. The RAM 903 temporarily stores a program used in the execution by the CPU 901 or a parameter or the like that appropriately changes during the execution. These components are interconnected via the host bus 904a composed of a CPU bus or the like.

The host bus 904a is connected to the external bus 904b such as peripheral component interconnect/interface (PCI) bus through the bridge 904. Moreover, the host bus 904a, the bridge 904, and the external bus 904b are not necessarily configured as separate components, and the functions of them may be incorporated into a single bus.

The input device 906 is configured to include input means through which the user can input information and an input control circuit that generates an input signal on the basis of the input by the user and outputs it to the CPU 901. An example of the input means includes a mouse, a keyboard, a touch panel, a button, a microphone, a switch, and a lever. The output device 907 includes, in one example, a display device such as a liquid crystal display (LCD) device, an organic light emitting diode (OLED) device, or a lamp, and a speech output device such as a speaker.

The storage device 908 is an example of the storage unit of the information processing device 100 and is a device for storing data. The storage device 908 may include a recording medium, a recording device that records data in the recording medium, a readout device that reads out data from the recording medium, and a deletion device that deletes data recoded in the recording medium. The storage device 908 drives a hard disk, and stores a program executed by the CPU 901 and various kinds of data.

The drive 909 is a reader-writer for a recording medium, and is built in the information processing device 100 or is externally attached thereto. The driver 909 reads out information recorded in a mounted magnetic disk, optical disk, magneto-optical disc, or removable storage medium such as a semiconductor memory, and outputs the information to the RAM 903.

The connection port 911 is an interface connected to an external device and is a port for connecting an external device that is capable of transmitting data through, in one example, a universal serial bus (USB). Furthermore, the communication device 913 is, in one example, a communication interface composed of a communication device or the like for connecting to a communication network 5. Furthermore, the communication device 913 may be a communication device compatible with a wireless local area network (LAN), a communication device compatible with a wireless USB, or a wired communication device that communicates with wire.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Moreover, in the embodiment described above, the front (S-plane) of the projection device 10 is a surface perpendicular to the projection direction in the projection space V onto which the image is projected by the projection device 10, but the present disclosure is not limited to this example. In one example, when viewing in the projection direction of the projection device 10, in some cases, the surface facing the front of the viewer, such as the corner portion, is not a surface perpendicular to the projection direction. In addition, there are some cases where an image is projected onto a wavy surface such as a curtain. In such cases, the image processing may be performed not only on the non-front image but also on the front image or the front peripheral image so that these images are appropriately displayed on the projection plane.

In one example, as in the first and third embodiments, in the case where an image is projected in the projection space V, a plane on which the front image is projected and its projection area are determined depending on the analyzed spatial structure, and a front image generation unit that performs image processing depending on the inclination and shape of the projection plane on which the front image is projected may be provided in the image generation unit. Alternatively, the image processing may be performed so that an image is appropriately displayed on each projection plane by the non-front image generation unit in consideration of all the non-front images. In addition, as in the second and fourth embodiments, in the case where the primary display device is provided in the projection space V, the image processing may be performed depending on the inclination and shape of the projection plane on which the front peripheral image is projected by the front peripheral image generation unit.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an image analysis unit configured to analyze a content of an input image projected by a projection device; and a projection position determination unit configured to determine a projection area in a projection space onto which the input image is projected by the projection device on the basis of an analysis result obtained by analyzing the input image.

(2)

The information processing device according to (1), further including:

a spatial structure analysis unit configured to analyze a spatial structure of a space onto which the input image is projected; and an association processing unit configured to determine image areas of the input image to be projected onto a projection plane of the space on the basis of the analyzed spatial structure and the projection area.

(3)

The information processing device according to (2), further including:

an image generation unit configured to generate an output image, from the input image, by performing image processing on images in the image areas projected onto the projection plane depending on the projection plane of the space.

(4)

The information processing device according to (3), in which the association processing unit determines a front image area and a non-front image area for the input image, the front image area being projected onto a first projection plane perpendicular to a projection direction by the projection device, the non-front image area being projected onto a portion other than the first projection plane, and the image generation unit performs image processing on the non-front image area depending on an inclination of the projection plane.

(5)

The information processing device according to (4), in which, in a case where a primary display device in which at least a portion of the input image is displayed is provided in the space, the spatial structure analysis unit analyzes the spatial structure and analyzes positional relationship between the analyzed spatial structure and the primary display device, and the image generation unit removes an image portion of the input image corresponding to the front image area or the non-front image area that includes a display surface of the primary display device.

(6)

The information processing device according to any one of (1) to (5), in which the image analysis unit analyzes a category relating to an image content of the input image.

(7)

The information processing device according to any one of (1) to (5), in which the image analysis unit analyzes the content of the input image on the basis of metadata of the input image.

(8)

The information processing device according to any one of (1) to (7), in which the projection position determination unit changes the determined projection area of the input image on the basis of a position of a user existing in the projection space.

(9)

The information processing device according to any one of (1) to (8), further including:

a spatial structure analysis unit configured to analyze a spatial structure of a space onto which the input image is projected; and a control unit configured to control setting of the projection device on the basis of the analyzed spatial structure and the projection area of the input image.

(10)

The information processing device according to (9), in which the control unit changes the setting of the projection device depending on a user's preference.

(11)

The information processing device according to any one of (3) to (10), further including:

an emotional video processing unit configured to generate an emotional video to be displayed around the input image on the basis of a feature amount of content displayed as the input image.

(12)

The information processing device according to (11), in which the emotional video processing unit includes an original image acquisition unit configured to extract motion information included in the content on the basis of the feature amount of the content and to acquire an original image used to generate the emotional video on the basis of the motion information, a color determination unit configured to determine a color of the emotional video on the basis of a hue of an entire image of the content, and an emotional image generation unit configured to generate the emotional video on the basis of the acquired original image and the color of the emotional video.

(13)

The information processing device according to (12), in which the original image acquisition unit acquires an original image having a high degree of similarity in feature points with the image of the content from an original image group including a plurality of original images to be selected, on the basis of the motion information of the image of the content.

(14)

The information processing device according to any one of (11) to (13), further including:

an emotional video switching determination unit configured to analyze scene change of the content and to determine to switch the emotional video.

(15)

The information processing device according to any one of (11) to (14), in which the image generation unit generates the output image on the basis of the input image and the emotional video.

(16)

A method of information processing, the method including:

analyzing a content of an input image projected by a projection device; and determining a projection area in a projection space onto which the input image is projected by the projection device on the basis of an analysis result obtained by analyzing the input image.

(17)

A program for causing a computer to function as an information processing device including:

an image analysis unit configured to analyze a content of an input image projected by a projection device; and a projection position determination unit configured to determine a projection area in a projection space onto which the input image is projected by the projection device on the basis of an analysis result obtained by analyzing the input image.

(18)

An image display system including:

a projection device configured to project an image;

an image analysis unit configured to analyze a content of an input image projected by the projection device; and a projection position determination unit configured to determine a projection area in a projection space onto which the input image is projected by the projection device on the basis of an analysis result obtained by analyzing the input image.

REFERENCE SIGNS LIST 100 information processing device
110 analysis processing unit
111 broadcasting signal reception unit
112 image capturing unit
113 storage unit
114 image input unit
115 image analysis unit
116 projection position determination unit
117 spatial structure analysis unit
118 spatial structure holding unit
119 user position detection unit
120 position control unit
121 projection position control unit
122 user setting unit
123 setting information holding unit
124 controlled-variable determination unit
125 setting change unit
130 image generation unit
131 association processing unit
132 non-front image generation unit
133 output image generation unit
134 front peripheral image generation unit
140 emotional video processing unit
141 primary display image input unit
143 content analysis unit
143a facial expression analysis unit
143b line-of-sight analysis unit
143c shaking analysis unit
143d scene analysis unit
143e detection unit
145 emotion matching processing unit
147 approximate image storage unit
149 emotional video generation unit

The invention claimed is:

1. An information processing device, comprising:
a central processing unit (CPU) configured to:
analyze content of an input image;
determine a category of the content of the input image based on the analyzed content;
select a set of projection planes from a plurality of projection planes in a projection space based on the determined category;
determine a projection area in the projection space based on the selected set of projection planes, wherein portions of the input image are concurrently projectable by a projection device on the set of projection planes of the projection area;
extract motion information including a motion direction of a first object in the content based on a feature amount of the content of the input image;
generate a video including a second object having feature points similar to feature points of the content of the input image;
determine a motion direction of the second object based on the motion direction of the first object; and
control display of the video in the projection area based on the determined motion direction such that the second object is displayed around the input image.

2. The information processing device according to claim 1, wherein
the CPU is further configured to:
analyze a spatial structure of the projection space; and
determine a plurality of image areas of the input image based on the analyzed spatial structure and the projection area, wherein the plurality of image areas of the input image is projectable on the plurality of projection planes of the projection space.

3. The information processing device according to claim 2, wherein the CPU is further configured to execute an image processing operation on images in the plurality of image areas based on the plurality of projection planes of the projection space.

4. The information processing device according to claim 3, wherein
the input image comprises a front image area and a non-front image area,
the front image area is projectable on a first projection plane of the plurality of projection planes,
the first projection plane is perpendicular to a projection direction of the projection device,
the non-front image area is projectable on a second projection plane, of the plurality of projection planes, different from the first projection plane, and
the CPU is further configured to execute the image processing operation on the non-front image area based on an inclination of the second projection plane with respect to the projection direction of the projection device.

5. The information processing device according to claim 4, wherein, based on a primary display device that displays a portion of the input image,
the CPU is further configured to:
analyze a positional relationship between the primary display device and the analyzed spatial structure of the projection space; and
remove an image portion of the input image corresponding to one of the front image area or the non-front image area, wherein the image portion of the input image is displayed on the primary display device.

6. The information processing device according to claim 1, wherein the CPU is further configured to analyze the content of the input image based on metadata of the input image.

7. The information processing device according to claim 1, wherein the CPU is further configured to:
analyze a spatial structure of the projection space; and
control a setting of the projection device based on the analyzed spatial structure and the projection area.

8. The information processing device according to claim 7, wherein the CPU is further configured to change the setting of the projection device based on a user preference.

9. The information processing device according to claim 1, wherein the CPU is further configured to:
acquire the second object based on the motion information;
determine a color of the video based on a hue of the content; and
generate the video based on the acquired second object and the color of the video.

10. The information processing device according to claim 9, wherein
the CPU is further configured to acquire the second object from a plurality of second objects based on a degree of similarity of the feature points of the content of the input image and the feature points of the second object, and
the degree of similarity corresponding to the acquired second object is highest among that of the plurality of second objects.

11. The information processing device according to claim 1, wherein the CPU is further configured to:
generate a histogram based on luminance information of the input image;
analyze a scene change of the content of the input image based on the histogram; and
control the generation of the video based on the analysis of the scene change.

12. The information processing device according to claim 1, wherein the CPU is further configured to generate an output image based on the input image and the video.

13. The information processing device according to claim 1, wherein
the category of the input image comprises one of landscape, attraction, or night sky,
in a case where the category of the input image comprises the landscape, the input image is projected on each of a front plane of the plurality of projection planes perpendicular to a projection direction of the projection device, a left side plane of the plurality of projection planes, and right side plane of the plurality of projection planes such that a panorama is viewable,
in a case where the category of the input image comprises the night sky, the input image is projected on each of the front plane, the left side plane, the right side plane, and a ceiling plane of the plurality of projection planes such that a sky image projected on the ceiling plane is viewable, and
in a case where the category of the input image comprises the attraction, the input image is projected on each of the front plane, the left side plane, the right side plane, and a floor plane of the plurality of projection planes.

14. The information processing device according to claim 1, wherein the CPU is further configured to
synchronize the motion direction of the second object of the video with the motion direction of the first object in the input image.

15. The information processing device according to claim 1, wherein the CPU is further configured to:
generate a histogram based on color information of the input image; and
analyze a scene change of the content of the input image based on the histogram.

16. A method of information processing, comprising:
analyzing content of an input image;
determining a category of the content of the input image based on the analyzed content;
selecting a set of projection planes from a plurality of projection planes in a projection space based on the determined category;
determining a projection area in the projection space based on the selected set of projection planes, wherein portions of the input image are concurrently projectable by a projection device on the set of projection planes of the projection area;
extracting motion information including a motion direction of a first object in the content based on a feature amount of the content of the input image;
generating a video including a second object having feature points similar to feature points of the content of the input image;
determining a motion direction of the second object based on the motion direction of the first object; and
controlling display of the video in the projection area based on the determined motion direction such that the second object is displayed around the input image.

17. A non-transitory computer-readable medium having stored thereon, computer-executable instructions, which when executed by a processor of an information processing device, cause the processor to execute operations, the operations comprising:

analyzing content of an input image;

determining a category of the content of the input image based on the analyzed content;

selecting a set of projection planes from a plurality of projection planes in a projection space based on the determined category;

determining a projection area in the projection space based on the selected set of projection planes, wherein portions of the input image are concurrently projectable by a projection device on the set of projection planes of the projection area;

extracting motion information including a motion direction of a first object in the content based on a feature amount of the content of the input image;

generating a video including a second object having feature points similar to feature points of the content of the input image;

determining a motion direction of the second object based on the motion direction of the first object; and controlling display of the video in the projection area based on the determined motion direction such that the second object is displayed around the input image.

18. An image display system, comprising:
a central processing unit (CPU) configured to:
    analyze content of an input image;
    determine a category of the content of the input image based on the analyzed content;
    select a set of projection planes from a plurality of projection planes in a projection space based on the determined category;
    determine a projection area in the projection space based on the selected set of projection planes;
    extract motion information including a motion direction of a first object in the content based on a feature amount of the content of the input image;
    generate a video including a second object having feature points similar to feature points of the content of the input image; and
    determine a motion direction of the second object based on the motion direction of the first object; and
a projection device configured to:
    concurrently project portions of the input image on the set of projection planes of the projection area; and
    control display of the video in the projection area based on the determined motion direction such that the second object is displayed around the input image.

* * * * *